United States Patent
Friskney et al.

(10) Patent No.: US 9,356,862 B2
(45) Date of Patent: *May 31, 2016

(54) DIFFERENTIAL FORWARDING IN ADDRESS-BASED CARRIER NETWORKS

(71) Applicant: RPX Clearinghouse LLC, San Francisco, CA (US)

(72) Inventors: Robert Friskney, Essex (GB); Nigel Bragg, Cambridgeshire (GB); Simon Parry, Essex (GB); Peter Ashwood-Smith, Gatineau (CA); David Allan, Ottawa (CA); Simon Brueckheimer, London (GB)

(73) Assignee: RPX CLEARINGHOUSE LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,001

(22) Filed: Sep. 5, 2014

(65) Prior Publication Data

US 2015/0016262 A1    Jan. 15, 2015

Related U.S. Application Data

(63) Continuation of application No. 13/683,672, filed on Nov. 21, 2012, now Pat. No. 8,976,793, which is a continuation of application No. 10/593,108, filed as (Continued)

(51) Int. Cl.
*H04L 12/28* (2006.01)
*H04L 12/741* (2013.01)
(Continued)

(52) U.S. Cl.
CPC ............ *H04L 45/74* (2013.01); *H04L 12/4641* (2013.01); *H04L 12/4645* (2013.01);
(Continued)

(58) Field of Classification Search
CPC ...................... H04L 29/06095; H04L 29/0653; H04L 45/74; H04L 12/4604; H04L 12/28
See application file for complete search history.

(56) References Cited

U.S. PATENT DOCUMENTS 5,485,455 A   1/1996   Dobbins et al.
5,546,038 A   8/1996   Croft (Continued)

FOREIGN PATENT DOCUMENTS

EP   1158724 A2   11/2001
EP   1538786 A2   6/2005

(Continued)

OTHER PUBLICATIONS

Ccamp Working Group T Kawakami G Velev Masushita N Ogashiwa Jaist Hogawa CRL, Method to Set Up LSP Using VLAN Tag Switching, IETF Standard-Working-Draft, Internet Engineering Task Force.

(Continued)

*Primary Examiner* — Andrew Lee
(74) *Attorney, Agent, or Firm* — Pearne & Gordon LLP

(57) ABSTRACT

The invention relates to enabling differential forwarding in address-based carrier networks such as Ethernet networks. There is described a method of and connection controller for establishing connections (76, 77) in a frame-based communications network comprising nodes (71-75 and 78) such as Ethernet switches. The connections are established by configuring, in various of the nodes, mappings for forwarding data frames, such as Ethernet frames. The mappings are from a combination of a) a destination (or source) address corresponding to a destination (or source) node (73) of the connection and b) an identifier, such as a VLAN tag. The mappings are to selected output ports of the various nodes. By using the combination of destination (or source) address AND identifier, the mappings enable data frames belonging to different connections (76, 77) to be forwarded differentially (ie forwarded on different output ports) at a node (75) despite the different connections having the same destination node. This enables flexibility in routing connections and the ability to perform traffic engineering.

20 Claims, 14 Drawing Sheets

Related U.S. Application Data application No. PCT/GB2005/001332 on Apr. 6, 2005, now Pat. No. 8,923,292, which is a continuation-in-part of application No. 10/818,685, filed on Apr. 6, 2004, now abandoned.

(51) Int. Cl.
*H04L 12/46* (2006.01)
*H04L 12/715* (2013.01)
*H04L 12/721* (2013.01)
*H04L 12/931* (2013.01)
*H04L 12/803* (2013.01)
*H04L 12/937* (2013.01)

(52) U.S. Cl.
CPC ............... *H04L45/54* (2013.01); *H04L 45/64* (2013.01); *H04L 45/66* (2013.01); *H04L 47/122* (2013.01); *H04L 49/205* (2013.01); *H04L 49/253* (2013.01); *H04L 49/254* (2013.01); *H04L 49/351* (2013.01); *H04L 49/354* (2013.01)

(56) References Cited

U.S. PATENT DOCUMENTS

| | | |
|---|---|---|
| 5,560,038 A | 9/1996 | Haddock |
| 5,959,990 A | 9/1999 | Frantz et al. |
| 6,151,324 A | 11/2000 | Belser et al. |
| 6,181,699 B1 | 1/2001 | Crinion et al. |
| 6,249,521 B1 | 6/2001 | Kerstein |
| 6,396,811 B1 | 5/2002 | Petersen |
| 6,449,279 B1 | 9/2002 | Belser et al. |
| 6,457,058 B1 | 9/2002 | Ullum et al. |
| 6,515,913 B2 | 2/2003 | Kajigaya et al. |
| 6,515,993 B1 | 2/2003 | Williams et al. |
| 6,556,541 B1 | 4/2003 | Bare |
| 6,563,832 B1 | 5/2003 | Stuart et al. |
| 6,754,211 B1 | 6/2004 | Brown |
| 6,788,681 B1 | 9/2004 | Hurren et al. |
| 6,789,121 B2 | 9/2004 | Lamberton et al. |
| 6,839,327 B1 | 1/2005 | Zavalkovsky et al. |
| 6,934,260 B1 | 8/2005 | Kanuri |
| 6,937,576 B1 | 8/2005 | Di Benedetto et al. |
| 6,990,106 B2 | 1/2006 | Bhatia |
| 7,046,680 B1 | 5/2006 | McDysan et al. |
| 7,075,926 B2 | 7/2006 | Cathey et al. |
| 7,079,544 B2 | 7/2006 | Wakayama et al. |
| 7,099,544 B2 | 8/2006 | Bickham |
| 7,130,303 B2 | 10/2006 | Hadzic |
| 7,301,949 B2 | 11/2007 | Eriksson |
| 7,352,770 B1 | 4/2008 | Yonge et al. |
| 7,359,389 B2 | 4/2008 | Kusayanagi |
| 7,394,758 B2 | 7/2008 | Gonda |
| 7,471,691 B2 | 12/2008 | Black et al. |
| 7,492,768 B2 | 2/2009 | Yoon et al. |
| 7,548,541 B2 | 6/2009 | Ishwar et al. |
| 7,558,273 B1 | 7/2009 | Grosser et al. |
| 7,619,966 B2 | 11/2009 | Lee |
| 7,693,144 B2 | 4/2010 | de Heer |
| 7,693,149 B2 | 4/2010 | Cathey et al. |
| 7,693,164 B1 | 4/2010 | Busch et al. |
| 7,710,871 B2 | 5/2010 | Lavian et al. |
| 7,715,379 B2 | 5/2010 | Gonda |
| 7,746,768 B2 | 6/2010 | Gonda |
| 7,782,860 B2 | 8/2010 | Eriksson |
| 7,792,100 B2 * | 9/2010 | Hato et al. ................... 370/389 |
| 7,916,746 B2 | 3/2011 | Yonge et al. |
| 7,920,561 B2 | 4/2011 | Gonda |
| 8,149,836 B2 | 4/2012 | Porat |
| 8,605,727 B1 * | 12/2013 | Bishara ................... 370/392 |
| 8,761,034 B2 | 6/2014 | Gero et al. |
| 8,767,749 B2 | 7/2014 | Porat |
| 8,804,720 B1 | 8/2014 | Rainovic et al. |
| 2001/0046229 A1 | 11/2001 | Clear et al. |
| 2001/0053150 A1 | 12/2001 | Clear et al. |
| 2002/0009090 A1 | 1/2002 | Kalkunte et al. |
| 2002/0016856 A1 | 2/2002 | Tallegas et al. |
| 2002/0021701 A1 | 2/2002 | Lavian et al. |
| 2002/0031142 A1 | 3/2002 | Metin et al. |
| 2002/0064128 A1 | 5/2002 | Hughes et al. |
| 2002/0085560 A1 | 7/2002 | Cathey et al. |
| 2002/0131414 A1 | 9/2002 | Hadzic |
| 2002/0185473 A1 | 12/2002 | Carlson et al. |
| 2002/0191250 A1 | 12/2002 | Graves et al. |
| 2003/0037163 A1 | 2/2003 | Kitada et al. |
| 2003/0043736 A1 | 3/2003 | Gonda |
| 2003/0046545 A1 | 3/2003 | Merkle et al. |
| 2003/0067928 A1 | 4/2003 | Gonda |
| 2003/0123462 A1 | 7/2003 | Kusayanagi |
| 2003/0126286 A1 | 7/2003 | Lee |
| 2003/0142674 A1 | 7/2003 | Casey |
| 2003/0152075 A1 | 8/2003 | Hawthorne et al. |
| 2003/0214962 A1 | 11/2003 | Allaye-Chan et al. |
| 2003/0237002 A1 | 12/2003 | Oishi et al. |
| 2004/0023501 A1 | 2/2004 | Lee et al. |
| 2004/0037279 A1 | 2/2004 | Zelig et al. |
| 2004/0042454 A1 | 3/2004 | Zabihi et al. |
| 2004/0047353 A1 | 3/2004 | Umayabashi et al. |
| 2004/0081171 A1 | 4/2004 | Finn |
| 2004/0081180 A1 | 4/2004 | De Silva et al. |
| 2004/0081203 A1 | 4/2004 | Sodder et al. |
| 2004/0133619 A1 | 7/2004 | Zelig et al. |
| 2004/0174887 A1 | 9/2004 | Lee |
| 2004/0202156 A1 | 10/2004 | Fonden et al. |
| 2004/0213235 A1 | 10/2004 | Marshall et al. |
| 2004/0221051 A1 | 11/2004 | Liong et al. |
| 2004/0223501 A1 | 11/2004 | Mackiewich et al. |
| 2005/0013297 A1 | 1/2005 | Eriksson |
| 2005/0025045 A1 | 2/2005 | Shimozono et al. |
| 2005/0094577 A1 | 5/2005 | Ashwood-Smith |
| 2005/0094634 A1 | 5/2005 | Santhanakrishnan et al. |
| 2005/0220096 A1 | 10/2005 | Friskney et al. |
| 2005/0265329 A1 | 12/2005 | Havala et al. |
| 2005/0286541 A1 | 12/2005 | Bottorff et al. |
| 2006/0029032 A1 | 2/2006 | Allan et al. |
| 2006/0101159 A1 | 5/2006 | Yeh et al. |
| 2006/0146832 A1 | 7/2006 | Rampal et al. |
| 2006/0182118 A1 | 8/2006 | Lam et al. |
| 2006/0221950 A1 | 10/2006 | Heer |
| 2006/0248227 A1 | 11/2006 | Hato et al. |
| 2006/0251069 A1 | 11/2006 | Cathey et al. |
| 2007/0133558 A1 * | 6/2007 | Wu ........................ 370/395.5 |
| 2007/0280222 A1 | 12/2007 | Smith et al. |
| 2008/0037559 A1 | 2/2008 | Eriksson |
| 2008/0049621 A1 | 2/2008 | McGuire et al. |
| 2008/0130417 A1 | 6/2008 | Bhavnani |
| 2008/0175265 A1 | 7/2008 | Yonge et al. |
| 2008/0239957 A1 | 10/2008 | Tokura et al. |
| 2008/0259786 A1 | 10/2008 | Gonda |
| 2008/0279196 A1 | 11/2008 | Friskney et al. |
| 2009/0059799 A1 | 3/2009 | Friskney et al. |
| 2009/0073988 A1 | 3/2009 | Ghodrat et al. |
| 2009/0310481 A1 | 12/2009 | Deng et al. |
| 2010/0177775 A1 | 7/2010 | Gonda |
| 2010/0290343 A1 | 11/2010 | Tanaka et al. |
| 2010/0309912 A1 | 12/2010 | Mehta et al. |
| 2011/0080855 A1 | 4/2011 | Fung |
| 2011/0126278 A1 * | 5/2011 | Volpano ........................ 726/15 |
| 2012/0014387 A1 | 1/2012 | Dunbar et al. |
| 2012/0063306 A1 | 3/2012 | Sultan et al. |
| 2013/0070586 A1 | 3/2013 | Friskney et al. |
| 2013/0077495 A1 | 3/2013 | Friskney et al. |
| 2013/0176906 A1 | 7/2013 | Friskney et al. |

FOREIGN PATENT DOCUMENTS

| | | |
|---|---|---|
| JP | 2002185473 A | 6/2002 |
| JP | 2002344476 A | 11/2002 |
| JP | 2003046545 A | 2/2003 |
| JP | 2003198610 A | 7/2003 |
| WO | 0036873 A1 | 6/2000 |
| WO | 03021858 A1 | 3/2003 |

(56) References Cited

FOREIGN PATENT DOCUMENTS

| WO | 03027807 A2 | 4/2003 |
|---|---|---|
| WO | 2005008971 A1 | 1/2005 |
| WO | 2005099183 A1 | 10/2005 |

OTHER PUBLICATIONS

ITU-TG.8031 (ITU-TG.8031/Y.1342, "Ethernet Protection Switching", Jun. 2006), 52 pages.
Marc Lasserre, Vach Kompella (Editors); "Virtual Private LAN Services over MPLS; draft-ietf-lvpn-vpls-idp-07.txt", IETF Standard-Working-Draft, Internet Engineering Task Force, IETF, CH, vol. l2vpn, No. 7, Jul. 1, 2005, XP015041095, ISSN: 0000-0004, pp. 1-25.
Bottorff, P. et al., "Provider Backbone Bridging Networks", Seminar on Metro Ethernet Technologies, Broadband Networking, Technology Department, Universitat Pompeu Fabra, Oct. 15, 2004, pp. 1-72; URL: http://www.tecn.upf.es/~_dsala/events/MEFoct04.html Retrieved from Internet on Nov. 7, 2006.
Chiruvolu, et al., "Issues and Approaches on Extending Ethernet Beyond LANs", Ethernet Transport Over Wide Area Networks, Communication Magazine, IEEE, vol. 42, Issue 3, Mar. 2004, pp. 80-86.
David Allen, et al., "Ethernet as Carrier Transport Infrastructure", IEEE Communications Magazine, Feb. 2006, pp. 134-140.
"Adding Scale, QoS and Operational Simplicity to Ethernet", Nortel Networks, Date: At least as early as Jun. 29, 2006, pp. 1-8.
Hamid Ould-Brahim, et al., "Service Requirements for Ethernet based L2VPNs; draft-ouldbrahim-ethernet-l2vpn-requirements-00. txt", IETF Standard-Working Draft, Internet Engineering Task Force, IETF, CH, Jul. 1, 2001, XP015033591, ISSN: 0000-0004, pp. 1-9.
Arnold Sodder Tenor Networks: "Virtual Hierarchical LAN Services; draft-sodder-ppvpn-vhis-00.txt", 20021010, Oct. 1, 2002, XP015035540, ISSN: 0000-0004, pp. 1-12.
"History of VPLS at IETF; 12Nov02-VPLS-history", IEEE Draft; 12NOV02-VPLS-History, IEEE-SA, Piscataway, NJ USA, vol. 802, 1, Jan. 9, 2003, pp. 1-16, XP017640064 [retrieved on Jan. 9, 2003).
Kawakami, "Method to Set Up LSP Using VLAN Tag Switching", IETF Standard Working Draft, Jun. 2003.
Ohashi, "How to Avoid Trouble of Switch LAN (Second Volume) Be Careful of Host Protocols", Nikkei Communications, No. 224, Jun. 17, 1996, pp. 124-129.
Koyuki Yamane, Escape from "Falling Wide Area Ethernet", Nikkei Communications, Issue 403, Japan, Nikkei Business Publication, Inc., Nov. 24, 2003, pp. 72-82.
Yoichi Hirose, "A Proposal of Wide Area Ethernet Service without MAC Address Learning", Proceedings of the IEICE general conference 2003, Communication 2, The Institute of Electronics, Information and Communciation Engineers (IEICE), Mar. 3, 2003, p. 352.
RFC 2474—K. Nichols et al., "Definition of the Differentiated Services Field (DS Field) in the IPv4 and IPv6 Headers", The Internet Society, Dec. 1998.
RFC 3246—B. Davie et al., "An Expedited Forwarding PHB (Per-Hop Behavior)", The Internet Society, Mar. 2002.
RFC 3032—E. Rosen et al., "MPLS Label Stack Encoding", The Internet Society, Jan. 2001.
RFC 3031—E. Rosen et al., "Multiprotocol Label Switching Architectures", The Internet Society, Jan. 2001.
RFC 2597—J. Heinanen et al. "Assured Forwarding PHB Group", The Internet Society, Jun. 1999.
RFC 2475—S. Blake et al., "An Architecture for Differentiated Services", The Internet Society, Dec. 1998.
RFC 3270—Le Faucher et al., "Multi-Protocol Label Switching (MPLS) Support of Differentiated Services", The Internet Society, May 2002.
IEEE P802.1ad/D4.0, "Virtual Bridged Local Area Networks—Amendment 4: Provider Bridges—Draft Standard for Local and Metropolitan Area Networks", IETF, Feb. 9, 2005.
Corresponding-Application-JP2012-223285-OA-Decision-to-Refuse, Dec. 9, 2014, 7 pages.

* cited by examiner

DIFFERENTIAL FORWARDING IN ADDRESS-BASED CARRIER NETWORKS

FIELD OF THE INVENTION

The present invention relates to methods of, software for and apparatus for differential forwarding in address-based carrier networks. In particular, but not exclusively, the present invention relates to methods of, software for and apparatus for differential forwarding and establishing connections in intrinsically connectionless carrier networks which address-based forwarding, such as Ethernet or IP networks.

BACKGROUND TO THE INVENTION

For many years now, telecommunications carriers have been deploying packet-switched networks in place of or overlaid upon circuit-switched networks for reasons of efficiency and economy. Packet-switched networks such as Internet Protocol (IP) or Ethernet networks are intrinsically connectionless in nature and as a result suffer from Quality of Service (QoS) problems. Customers value services which are guaranteed in terms of bandwidth and QoS.

Carriers may use Multi-Protocol Label Switching (MPLS) over a layer 2 network to create connection-oriented label switched paths (or tunnels) across the intrinsically connectionless network, and thereby to provide guaranteed QoS and bandwidth services to customers. However, MPLS is a relatively unstable and complex standard and carriers ideally desire an alternative.

It is desired to use Ethernet switches in carriers' networks. Use of Ethernet switches in carriers' networks would have the advantages of interoperability (mappings between Ethernet and other frame/packet/cell data structures such as IP, Frame Relay and ATM are well known) and economy (Ethernet switches are relatively inexpensive compared to IP routers, for example). It would also provide a distinct advantage of being the principal technology used by enterprises that require a wide area network service from a carrier and therefore able to work in a native mode.

However, the behaviour of conventional switched Ethernet networks is incompatible with carriers' requirements for providing guaranteed services to customers. Carriers need networks to be meshed for load balancing and resiliency—ie there must be multiple paths across it—and the ability to perform traffic engineering—ie the ability of the network operator to control the provision of explicitly routed variable bandwidth connections (or tunnels) through which traffic may be directed. This provides operators significant flexibility in that the physical network build is not obliged to correspond to the offered load and therefore is tolerant of changing usage patterns without requiring on going physical modifications.

In contrast, conventional Ethernet networks must be simply-connected—ie there must be one and only one logical path choice between each and every node of the network. As a consequence, conventional Ethernet networks do not have support for network-wide load balancing, suffer from resiliency problems and cannot support traffic engineering. Further the impact of a single failure with respect to the overall load carried can be significant.

Spanning tree protocols are known which enable a physically meshed Ethernet network to be logically transformed into a simply-connected network by detecting physical loops and logically disabling connections to break up the loops. Spanning tree protocols are also known which are able to detect failure of a physical connection (thereby partitioning the fully-connected network) and automatically restore one or more previously-disabled physical connections so as to re-connect the network. This provides a degree of resiliency. However, carriers need to plan their network traffic routes to achieve much higher resiliency, flexibility and efficiency than spanning tree can achieve. This level of routing capability is best achieved by segregating the traffic into connections whose routes are determined as part of this planning process.

Virtual Bridged LANs (or VLANs) are described in the Institute of Electrical and Electronics Engineers (IEEE) standard 802.1Q, 2003 Edition. FIG. 1 shows a conventional VLAN 10 split up into a plurality of component LANs 12 and connected via VLAN-aware Media Access Control (MAC) bridges 14. Component LANs 12 are typically provided for different communities of interest, such as users sharing a common server or having common network protocol requirements. Unique identifiers (VLAN tags or VLAN IDs) are used to identify each component LAN. Broadcast traffic is broadcast only within component LANs. This helps to overcome the scalability issues of Ethernet by partitioning the whole network 10 resources into smaller broadcast domains. VLAN tags are used to distinguish between traffic for different component LANs when forwarding traffic on shared links between MAC bridges. However the size of the standard VLAN tag is limited to 12 bits, which in turn limits the scale of the network and the number of partitions of component LANs to 4094, where two VLAN tags are reserved with special meaning not for general assignment.

The Internet Engineering Task Force (IETF) has published an Internet Draft referred to as draft-kawakami-mpls-lsp-vlan-00.txt. This document describes the use of VLAN tags for label switching across Ethernet networks in a manner similar to use of MPLS labels for label switching over MPLS networks—VLAN tags are used as labels to mark traffic at an ingress point of a label switched path (LSP) as belonging to a Layer 2 tunnel, and VLAN-aware Ethernet switches in the network act as a VLAN label switched routers. Connections are formed using one or more LSPs. Intermediate nodes along the connection may optionally swap the inbound label to a different outbound label. In this manner the VLAN tag has meaning specific to any given local node, and the ability to reuse VLAN tags solves some of the scalability issues of 802.1Q.

However, one problem with the method proposed in draft-kawakami-mpls-lsp-vlan-00.txt is that only a maximum of 4094 unique VLAN tags are definable in 802.1Q compliant equipment. This still limits the flexibility and increases the complexity of provisioning connections across the network. Another problem is that connections may not easily be re-routed once provisioned without in general creating transitory loops.

Another problem is that since the Frame Check Sequence (FCS) in Ethernet frames is computed over both the payload and header portions of the frame, every time a VLAN tag (ie a label) is swapped at the ingress or egress point of a LSP, the FCS needs to be recomputed since the VLAN tag will have changed. This requires performing a computation function over the entire Ethernet frame. Moreover, during the interval from when the original FCS is removed and the new FCS added, the frame is vulnerable to corruption without the protection of any FCS.

Yet another problem with the 'label-swapping' approach proposed in draft-kawakami-mpls-lsp-vlan-00.txt is that it requires a "chain of correctness", in that forwarding relies on each local label-forwarded link on the LSP being correct. This should be contrasted with conventional Ethernet which uses globally unique address information to perform forwarding As the LSP labels are not globally unique per conventional Ethernet, it is possible for a forwarding fault in performing label translation to be concealed if a value is incorrectly mapped to another value that is in use. More importantly, from a practical perspective, 'label-swapping' behaviour represents a significant change from conventional Ethernet switch functionality, and current telecommunications standards.

SUMMARY OF THE INVENTION

The present invention relates to enabling the establishment of connections in frame-based networks such as Ethernet networks. The capability of establishing connections in an Ethernet network provides the ability to partition the network resources in a specific way that could be for traffic engineering purposes, to pin paths over physically diverse routes for improved resilience, and monitor those resources for performance purposes, audit integrity, locate faults and other proactive verification purposes. The term traffic engineering is used broadly in the present document to refer to functions for establishing and maintaining the quality of service of the customers' connections while permitting the owner to operate their network efficiently. Examples of this are ensuring that no link is over-loaded, load-balancing the connections in a preferred manner across the network, re-planning the load on the network by re-routing some existing connections, establishing protection mechanisms, performing traffic restoration actions, relative priority of different traffic types, admission control, policing, scheduling and so on.

According to an embodiment of the present invention, connections are established in the carrier network by configuring, in one or more network nodes, mappings for forwarding data frames such as Ethernet frames. The mappings are from a combination of a) a destination (or source) address corresponding to a destination (or source) node of a connection, such as a MAC address, and b) an identifier, which for Ethernet may be a reuse of a VLAN tag which then is no longer necessarily unique to a subnet, but only necessarily unique when combined with the destination (or source) address. The mappings are to selected output ports of the one or more nodes. By using the combination of address AND identifier, the mappings enable data frames belonging to different connections to be forwarded differentially (ie forwarded on different output ports) despite the different connections potentially having the same destination (or source) node. This enables flexibility in routing connections—eg the ability to perform traffic engineering. The reader should note that the term address is used in this document to denote any means of identifying a network node or an ingress or egress interface of a network node, or any sub unit of a network node, for example a port card or an encapsulation function of a network node.

According to a first aspect of the present invention, there is provided a method of establishing a connection in a network, the method comprising the step of:
configuring, in a node of the network, a first mapping for use in forwarding data frames, the first mapping being from a combination of:
  a first network address uniquely identifying, within an addressing scheme of the network, a first node of the network, and
  a first identifier,
the first mapping being to a selected output port of the node, the configuring thereby establishing at least part of a first connection for forwarding data frames, the connection being through the node,
the first identifier being a qualifier of the first network address, the combination thereby enabling differential forwarding, at the node, of data frames addressed to or from the first node.

According to a second aspect of the present invention, there is provided a connection controller for establishing a connection in a network, the connection controller comprising:
a signal generator arranged in use to generate a first signal for configuring, in a node of the network, a first mapping for use in forwarding data frames, the first mapping being from a combination of:
  a first network address uniquely identifying, within an addressing scheme of the network, a first node of the network, and
  a first identifier,
the first mapping being to a selected output port of the node, the configuring thereby establishing at least part of a first connection for forwarding data frames, the connection being through the node,
the first identifier being a qualifier of the first network address, the combination thereby enabling differential forwarding, at the node, of data frames addressed to or from the first node.

According to a third aspect of the present invention, there is provided a network comprising a node configured with a first mapping for use in forwarding data frames, the first mapping being from a combination of:
  a first network address uniquely identifying, within an addressing scheme of the network, a first node of the network, and
  a first identifier,
the first mapping being to a selected output port of the node, the configuring thereby establishing at least part of a first connection for forwarding data frames, the connection being through the node,
the first identifier being a qualifier of the first network address, the combination thereby enabling differential forwarding, at the node, of data frames addressed to or from the first node.

A communications network comprising one or more nodes arranged to perform the method of the first aspect of the present invention set out above is also provided.

A computer program arranged to perform the method of the first aspect of the present invention set out above is also provided.

Advantageously, the present invention enables connections to be established in a frame-based network in a highly flexible manner enabling network-wide traffic engineering. Furthermore, the specific problems inherent in the method proposed in draft-kawakami-mpls-lsp-elan-00.txt (processing overhead and vulnerability of frames to corruption) are overcome since no label swapping is performed.

According to a fourth aspect of the present invention, there is provided a method of establishing connections in a frame-based network, the method comprising the step of configuring, in one or more nodes of the network, first mappings for use in forwarding data frames, the first mappings being from a combination of a first destination address corresponding to a first destination node of the network, and a first identifier, the first mappings being to a selected output port of, or to respective selected output ports of each of, the one or more nodes, thereby establishing at least part of a first connection through the one or more nodes to the first destination node.

In one embodiment, the method of the present invention includes configuring, in at least one of the nodes, a second mapping for use in forwarding data frames, the second mapping being from a combination of: a second destination address corresponding to a second destination node of the network, and a second identifier, the second mapping being to a selected output port of the at least one node, thereby establishing at least part of a second connection through the at least one node to the second destination node, the selected output ports of the at least one node being different for the first and second mappings, thereby enabling, at the at least one node, differential forwarding of data frames associated with the first and second connections.

Thus, advantageously, two connections may be established which converge in route at an intermediate node and then diverge again, for example.

In one embodiment, the first and second destination addresses and the first and second destination nodes are the same. Thus, for example, two connections may be established which converge at an intermediate node and then diverge, despite having the same destination node. This enables greater flexibility in setting up connections.

In one embodiment, the first and second identifiers are the same. Thus, for example, two connections may be established which converge at an intermediate node or nodes and then diverge, despite using the same identifier. Thus, limitations on the number of values identifiers can take do not significantly reduce flexibility in traffic engineering.

Preferably, the network is an Ethernet network and the one or more nodes are Ethernet switches. Preferably, the identifier is a VLAN tag. Advantageously, this enables traffic engineered carrier networks to be deployed using conventional and relatively inexpensive VLAN-aware Ethernet switches, albeit configured in an entirely novel and inventive manner.

In one embodiment, the configuration is performed by a control plane of the network. Thus, carriers have direct control over the establishment of traffic engineering connections in the network. Preferably, the control plane is ASON/ASTN. The control plane may be centralised or distributed.

A frame-based communications network comprising one or more nodes arranged to perform the method of the first aspect of the present invention set out above is also provided.

Software arranged to perform the method of the first aspect of the present invention set out above is also provided.

According to a fifth aspect of the present invention, there is provided a connection controller for establishing connections in a frame-based network, the connection controller comprising: a signal generator capable of generating a first signal for configuring, in a transport node of the network, a first mapping for use in forwarding data frames, the first mapping being from a combination of: a first destination address corresponding to a first destination node of the network, and a first identifier, the first mapping being to a selected output port of the transport node, the first signal thereby establishing at least part of a first connection through the transport node to the first destination node.

According to a sixth aspect of the present invention, there is provided a method of establishing a connection in a frame-based network, the method comprising the steps of: configuring forwarding information in a plurality of nodes of the network the forwarding information enabling the nodes to forward data frames in dependence on a combination of a destination address and an identifier of the data frames.

According to a seventh aspect of the present invention, there is provided a method of data traffic engineering in a frame-based network, the method comprising the following steps: establishing a first and second connections in the network passing through a common switching node of the network, configuring the switching node to forward data frames differently in dependence on differences in either a destination address or an identifier of the data frames, thereby enabling data traffic engineering.

According to a eighth aspect of the present invention, there is provided a method of establishing connections in a frame-based network, the method comprising the step of: configuring, in each of a first plurality of nodes of the network, a first forwarding mapping from a first combination of a destination address and an identifier to a selected output port of a respective node of the first plurality of nodes.

According to a ninth aspect of the present invention, there is provided a connection controller for establishing connections in a frame-based network, the connection controller being arranged to configure a first forwarding mapping in a transport node, the first mapping being from a first combination of a destination address and an identifier to a first output port of the transport node.

According to a tenth aspect of the present invention, there is provided a method of forwarding data frames in a frame-based network, the method comprising the steps of: establishing a first connection in the network, the first connection being associated with a first combination of a destination address and an identifier, and forwarding data frames in the network in dependence on a combination of a destination address and an identifier of the data frames.

Further aspects of the present invention are set out in the appended claims. Further advantages of the present invention will be apparent from the following description.

In order to show how the invention may be carried into effect, embodiments of the invention will now be described by way of example only and with reference to the accompanying figures in which:

DETAILED DESCRIPTION OF INVENTION

Embodiments of the present invention are described below by way of example only. These examples represent the best ways of putting the invention into practice that are currently known to the Applicant although they are not the only ways in which this could be achieved.

To support guaranteed QoS to customers, what is required is:
1) an at least partially meshed carrier network;
2) the ability to establish explicitly routed connections across the carrier network between any two edge nodes (traffic engineering); and
3) the ability to enforce any bandwidth restrictions and/or forwarding rules applied to the connections.

The present invention is primarily concerned with enabling requirements 1) and 2) above in frame-based networks such as Ethernet networks. Requirement 3) may be achieved for example using conventional mechanisms such as admission control in either or both of the control plane and at the ingress nodes of connections (trusted-edge policing). Alternatives to achieving requirement 3) are set out later in more detail.

Figure 2:
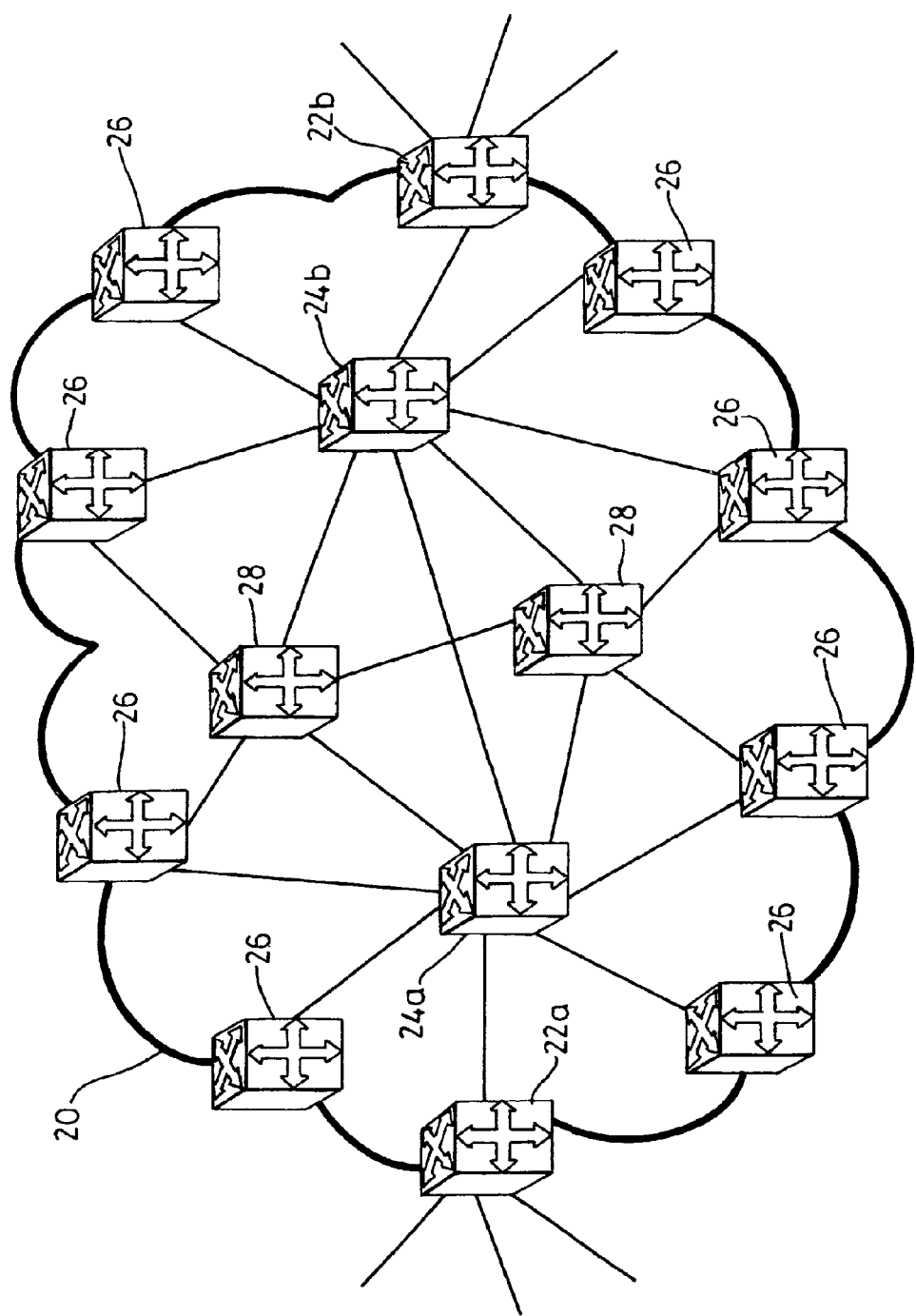
FIG. 2 shows an arrangement of Ethernet switches forming a carrier network according to the present invention.

FIG. 2 shows an arrangement of Ethernet switches and communications links forming a carrier network according to the present invention. Carrier network cloud 20 comprises Ethernet switches 22a, 22b, 24a, 24b, 26 and 28. Ethernet switches 22a, 22b and 26 are located at the edges of carrier network 20, whereas Ethernet switches 24a, 24b, and 28 are located in the core network. Communications links (shown as straight lines in FIG. 2) are provided between Ethernet switches 22a, 22b, 24a, 24b, 26 and 28. These communications links may be for example relatively long distance links over optical equipment such as SONET/SDH equipment with Ethernet interfaces using Generic Framing Procedure (GFP) (ITU-T Recommendation G.7041/Y.1303).

Note that core network switches 24a, 24b, and 28 are fully-meshed—ie there is a direct communications link connecting each core network switch 24a, 24b, and 28 to each other. Edge network switches 22a, 22b and 26 are not fully-meshed but have at least one direct communication link to communications link to a core network switch 24a, b or 28. The reader will appreciate that the particular network arrangement described is exemplary. In general, carrier networks may be implemented with virtually any number of Ethernet switches which, according to the present invention, may be connected in a fully-meshed or partially-meshed manner.

Figure 4:
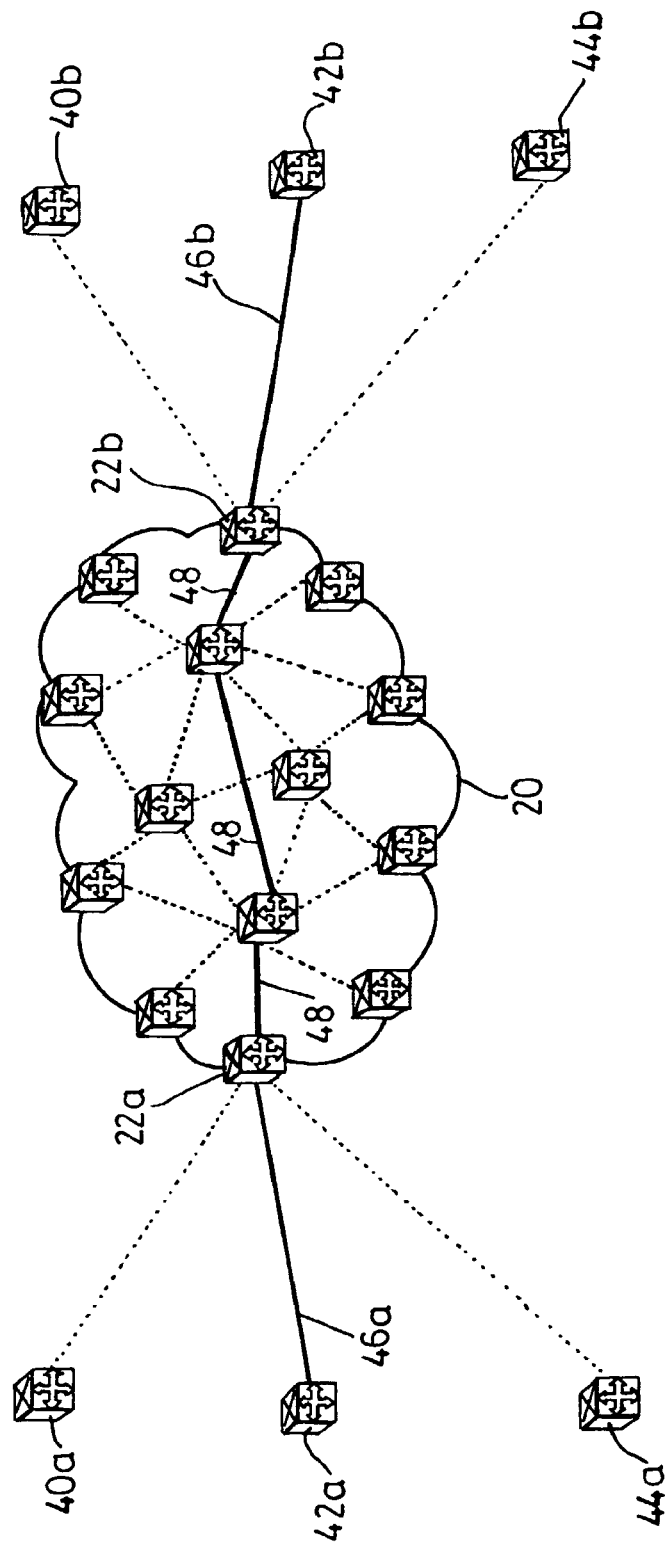
FIG. 4 shows the carrier Ethernet network of FIG. 1 arranged to provide connectivity between customer sites according to the present invention.

FIG. 4 shows how a carrier Ethernet network may provide connectivity between customer sites according to the present invention. Three customers having respective pairs of geographically distant Ethernet switches (40a and 40b, 42a and 42b, and 44a and 44b) are shown connected to carrier network via edge Ethernet switches 22a and 22b respectively. The communications links between edge switches 22a and 22b and customer switches 40a, 40b, 42a, 42b, 44a, and 44b may be dedicated links such as T1, E1 leased lines or access links such as digital Subscriber Lines (DSLs).

Carrier edge switches 22a, 22b (and 26 in FIG. 2) may be logically separated into a single Provider Edge-(PE-) Core and one or more PE-Edge functions. The PE-Edge is the ingress/egress point at which customer traffic enters or leaves the provider network—ie carrier network 20. The PE-Core preferentially encapsulates incoming Ethernet traffic from the customer using Media Access Control (MAC) in MAC encapsulation (or if desired Pseudo-Wire over MAC encapsulation) and forwards the encapsulated traffic across the carrier network. This embodiment is preferred as a mechanism to limit the number of table entries required because only the MAC address space of the carrier network need be recognised, and not the whole of customer's MAC address space which could be changed independently. Similarly the PE-Core decapsulates (strips) outgoing Ethernet traffic and forwards the stripped traffic on to the customer via the appropriate PE-Edge. VLAN tags are used to provide customer separation at the logical PE-Core with each different customer site connected to each edge switch having a unique VLAN tag. Stacked VLAN (ie VLAN in VLAN encapsulation or Q-in-Q) may be used to protect any VLAN tags used by the customer traffic.

For example, customer switch 42a may send Ethernet traffic over communications link 46a to the logical PE-Edge of edge switch 22a. Logical PE-Core of edge switch 22a encapsulates each Ethernet frame in a further Ethernet frame using the MAC address of edge switch 22a as the source address and the MAC address of the appropriate egress point—in this case edge switch 22b—as the destination address. The encapsulated traffic is forwarded across a connection established over communications links 48 of carrier network 20 to edge switch 22b. Connections may be typically trunked in the sense that traffic from multiple customers will be routed through the same connection. Alternatively, those skilled in the art will appreciate that separate connections 48 could be used for each customer. At the PE-Core of edge switch 22b, the original frames are stripped of their encapsulation and sent over communications link 46b via PE-Edge of edge switch 22b to customer switch 42b.

The reader will appreciate that in alternative embodiments of the present invention the logical PE-Edge may also be physically separated from the logical PE-Core and may reside at customer premises whereas the PE-Core would preferentially reside at a central office or Point of Presence (PoP) of the carrier. The reader will also appreciate that other edge switches 26 (FIG. 2) may also have connections to customer sites and that customers may have to be provided with connectivity between two or more geographically distant sites over carrier network 20.

It will now be described how carrier network 20 is arranged to establish connections through which to forward encapsulated Ethernet traffic. A connection may be defined as an entity configured in a network which provides transport of data from a source node to one or more sink nodes.

As described above, carrier network 20 must be at least partially-meshed—ie there must be more than one possible path between at least some, and preferably all, nodes of the network. Thus, as will be explained below, Ethernet MAC address auto learning functionality should preferably be at least partially deactivated.

On start-up (or on re-start), conventional switched Ethernet networks behave like a "classic" Ethernet Local Area Networks (LANs) in that every Ethernet frame is broadcast across the entire network. Thus, every switch, receiving an Ethernet frame on one port, broadcasts the frame out on every other port. The process repeats as the frame is received by other switches thus broadcasting the frame across the entire network.

MAC address auto-learning functionality is provided to improve configuration efficiency in switched Ethernet networks. Ethernet frames have source and destination MAC addresses corresponding to their source and destination Ethernet switches. (An Ethernet switch here is signifying an end system which is therefore configured with at least one MAC address.) When an Ethernet frame sent out by a source switch is received by an intermediate or destination Ethernet switch, the receiving switch observes the port on which the frame was received and the source address of the frame. It then builds up a forwarding table for use in future frame switching. The forwarding table maps destination address to output port and is built up using the source address of a received frame and the input port on which it was received. Over time, the network builds up forwarding state enabling efficient switching of Ethernet frames, without relying on broadcast any further.

It can thus be seen that conventional switched Ethernet networks using auto-learning must be simply-connected—ie there must be one and only one path between each and every node of the network. If there were multiple paths between any two nodes, the input port on which a frame is received from a source node would not be a reliable indicator of the correct output port to forward future traffic destined for that node. Inconsistencies in forwarding tables on Ethernet switches could result in looping of frames. Moreover, if there exists any loop in a part of the network then any broadcast packet will be continuously duplicated in that loop and the duplicates forwarded all over the whole network, limited only by the link capacities concerned. This inevitably results in catastrophic failure of the network.

Figure 1:
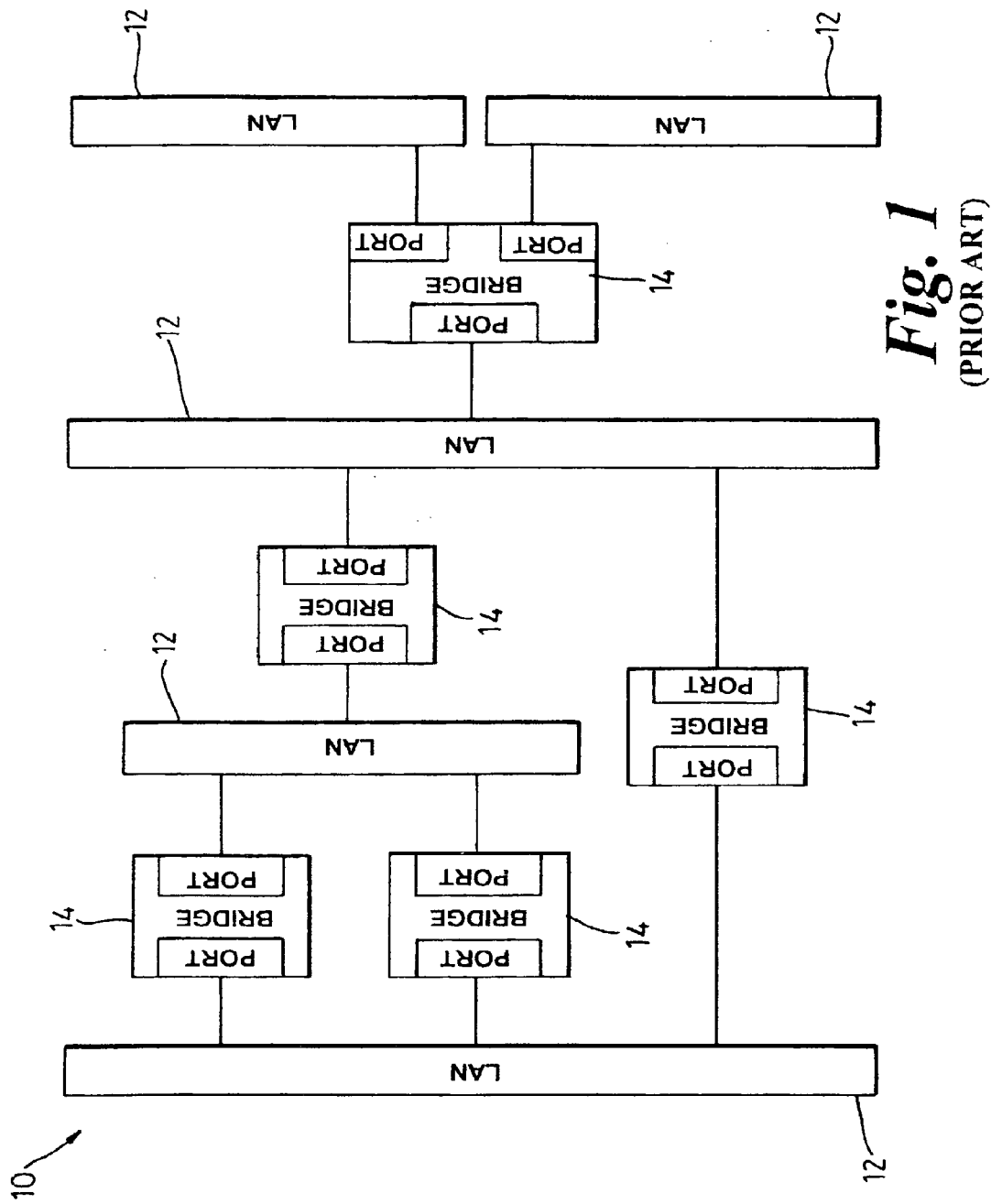
FIG. 1 shows a conventional Virtual Bridged LAN.
Figure 3:
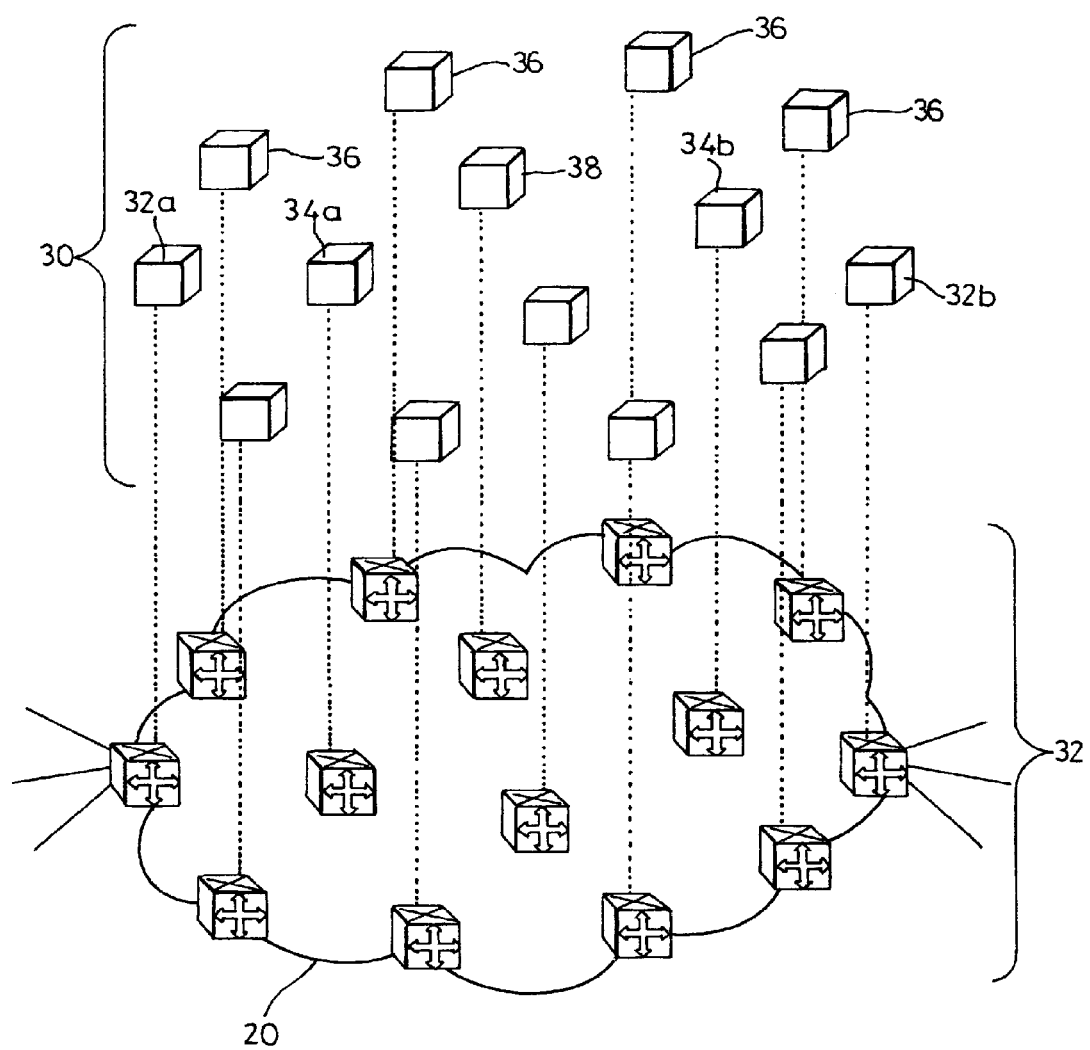
FIG. 3 shows a control plane/transport plane architecture for controlling the Ethernet carrier network of FIG. 1 according to the present invention.

According to the present invention, instead of using auto learning to configure forwarding tables in Ethernet switches, forwarding tables are directly configured using a novel Ethernet control plane. FIG. 3 shows a control plane/transport plane architecture for controlling the Ethernet carrier network of FIG. 1. The ITU-T Automatically Switched Transport Network (ASTN), sometimes known as the Automatically Switched Optical Network (ASON), may be used preferentially. The general architectural specification of the ASTN is set out in ITU-T Recommendation G.8080.

Control plane 30 comprises a number of connection controllers 32a, 32b, 34a, 34b, 36 and 38 corresponding to each of Ethernet switches 22a, 22b, 24a, 24b, 26 and 28 of carrier network 20 (not all connection controllers are labelled in FIG. 3, for clarity). Control Plane 30 may be conceptually thought of as lying 'above' transport plane 32 which comprises the Ethernet switches 22a, 22b, 24a, 24b, 26 and 28 of carrier network 20. Connection controllers (CCs) 30 are logical agents each corresponding to a respective Ethernet switch (which represent cross connects in ASTN terminology) in transport plane 32. Each CC controls the switching of its respective switch using Connection Control Interface (CCI) signalling (shown as dotted lines in FIG. 3). CCI signalling is used to directly configure the forwarding tables used by Ethernet switches 22a, 22b, 24a, 24b, 26 and 28 of carrier network 20. CCs may communicate between themselves using a Network to Network Interface (NNI). Typically, CCs will exchange information regarding their operational state and the state, in particular the capacity, of their communications links using NNI signalling. Other control plane functions such as heartbeat, ping and circuit monitoring may be provided using the ITU-T standard-in-preparation currently referred to as Y.17ethOAM or the methods in IEEE standard 802.1ag.

While CCs 32a, 32b, 34a, 34b, 36 and 38 are logically separate from Ethernet switches 22a, 22b, 24a, 24b, 26 and 28, the reader will understand that they may be implemented in the same physical nodes in a distributed control plane model. Additionally, one CC may control one or more Ethernet switches which is moving towards a more centralised control plane model. Furthermore, NNI signalling may take place over the same communications links used for transporting user traffic.

Figure 5:
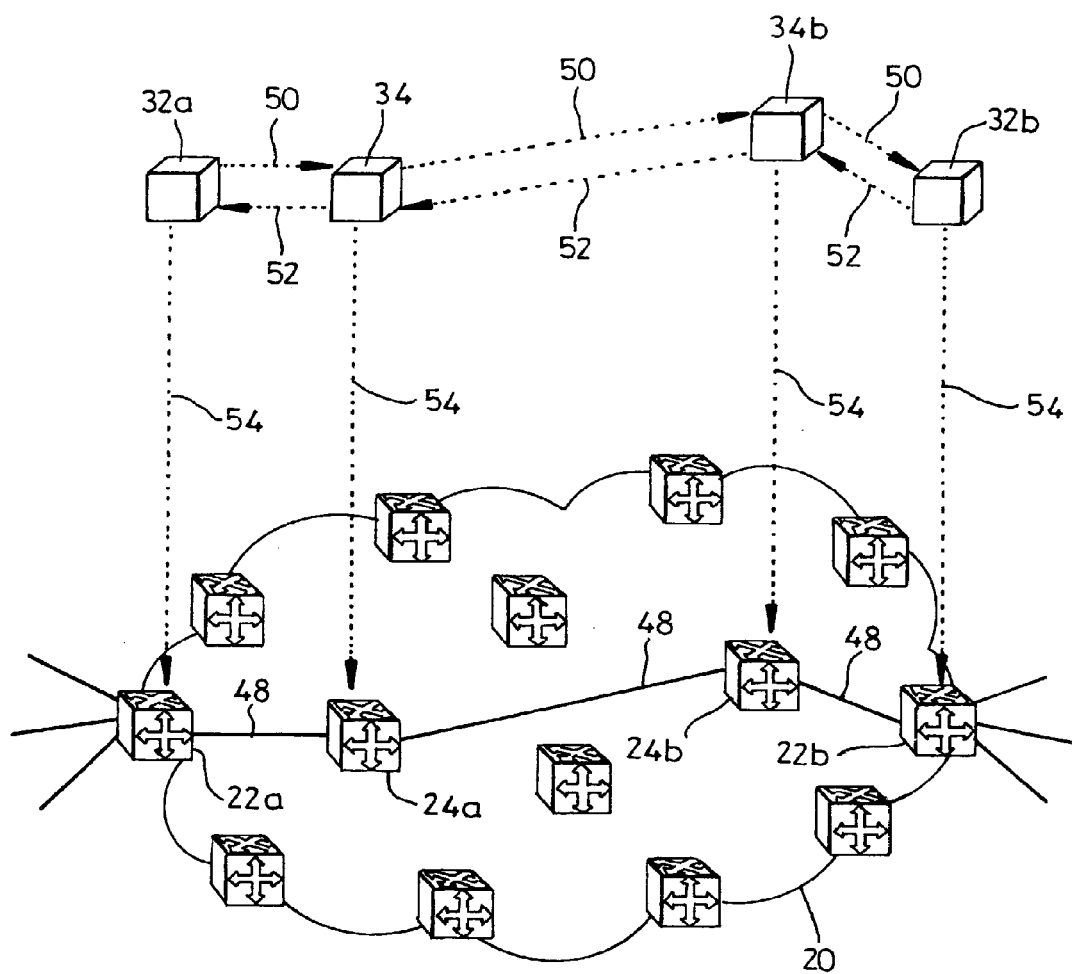
FIG. 5 shows how nodes of the control plane interact with Ethernet switches of the transport plane to establish a connection across carrier network according to the present invention.

FIG. 5 shows how control plane 30 interacts with transport plane 32 to establish a point-to-point connection across carrier network 20. Typically, the connection will be bi-directional, although this can simply be considered as the combination of two uni-directional point to point connections. A request to establish a connection specifying a required bandwidth and an explicit route across carrier network 20 is generated for example by a supervisory network management node (not shown) or distributed network management system or function. The explicit route will have been determined in accordance with a conventional routing protocol taking into account the topology of the carrier network, the operational state of network resources and the bandwidth requirements of existing and possible future connections. The route to be taken by the exemplary connection shown in FIG. 5 spans Ethernet switches 22a, 24a, 24b and 22b over communications links 48. Since the connections share many qualities with SONET/SDH trails, management systems already developed for SONET/SDH trail management may be reused for managing connections in the present invention—for example Nortel's Optical Network Manager. This has the advantage that carrier networks already using SONET/SDH trail management systems need not invest in new management systems when deploying the network arrangements proposed in the present invention. The route may also be established by direct NNI signalling between CCs in an ad-hoc fashion.

The request to establish a connection is first sent to CC 32a. On receipt of the request, CC 32a checks whether the communications link between switches 22a and 24a has sufficient capacity to support the required bandwidth. If so, it forwards a connection setup request message 50 to CC 34a specifying the required bandwidth and explicit route. CC 34a then checks whether the communications link between switches 24a and 24b has sufficient capacity to support the required bandwidth. The process continues until the connection setup message request 50 reaches CC 32b. Along the route, CCs may optionally reserve bandwidth of their respective switches and communication links so as to avoid race conditions where competing connections are setup over the same resources.

When connection setup request message 50 reaches CC 32b, if there is sufficient bandwidth along the entire path to support the required connection, then CC 32b sends a connection setup response message 52 back to CC 34b, CC 34a and finally to CC 32a. As the connection setup response message 52 traverses the CCs, each CC sends CCI signalling 54 to its respective switch to configure the forwarding tables of each switch, thereby to establish the forwarding state required to setup the connection.

It will be appreciated that the mechanism for establishing connections across carrier network 20 described above is merely exemplary and other well-known mechanisms may be used. For example, all the admission control may be performed in a centralised CC controlling several if not all the Ethernet switches in the extreme. In another example arrangement, the supervisory management function may be used to compute routes for connections and simultaneously perform the necessary admission control; this in turn would simplify the role performed by the CC. Yet another example is where the supervisory management function or CC consults a specialised and either centralised or distributed Bandwidth Manager or Policy Decision Function to perform the admission control.

How forwarding tables of the Ethernet switches of carrier network 20 are used to support connections is a key aspect of the present invention and will now be described in detail.

Typically, there will be many thousands or tens of thousands of connections established across a carrier network at any time. These connections will share the physical resources of the carrier network—ie the switches and communications links. Thus, each switch will typically have a large number of connections established through it at any point in time. However, each switch must be able to forward data traffic according to the explicit route requirements of the specific connection through which that traffic is being sent. A likely scenario is that the carrier network will need to establish multiple connections from the same source nodes, multiple connections to the same destination nodes and multiple connections both from the same source nodes and to the same destination nodes. However, for traffic engineering purposes, the latter connections may need to be established through physically distinct routes across the network. Furthermore, these routes may need to converge and diverge again within the carrier network. To support such route flexibility in connections, what is required is that each switch be able to differentiate between data traffic travelling in different connections and forward accordingly.

However, conventional switched Ethernet is incapable of this. As described above, conventional Ethernet switches forward traffic based solely on a forwarding table (established through auto learning) mapping destination address to output port. As a result, a conventional Ethernet switch will not be able to differentiate between data traffic having the same destination address, although it may be associated with multiple different connections.

According to the present invention, VLAN tags are used to enable differentiation of connections established across a carrier network and thereby to enable differential forwarding. Preferentially the VLAN tag defined in IEEE 802.1Q is applied in a novel manner such that the Ethernet switches of carrier network 20 are 802.1Q VLAN-aware but arranged to use a combination of destination address and VLAN tag to forward data traffic. This is preferentially achieved by reusing the existing capabilities in each Ethernet switch to store separate forwarding tables for each VLAN tag configured, the VLAN tag acting as a mapping (or indexing) to forwarding tables, and each forwarding table mapping destination address to output port. However in the present invention the group of forwarding tables are arranged to provide a mapping from a combination of destination address and VLAN tag to output port.

According to the preferred embodiment, VLAN tags have meaning only within the context of a destination address. As such, the allocation of VLAN tags is logically localised to the node owning the destination address, herein called the destination node. Thus, at the point where a new connection is requested, its destination node will allocate to that connection a VLAN tag to use in combination with a destination address corresponding to that node. This VLAN tag will be allocated such that no existing connection to the destination address whose route crosses with & subsequently diverges from the new connection shall share a VLAN tag. This is such that where differential forwarding is required (at the divergence point), the destination addressNLAN tag pair of the diverging connections are distinct.

Additional constraints can be placed on the allocation as described elsewhere to improve pathological behaviour in case of inadvertent partial route removal in a network where broadcast-on-unknown is not fully disabled on all VLAN tags used for connections.

Alternately, for simplicity, but at a cost of reduced scalability in VLAN tag usage, the destination node shall allocate a unique VLAN tag for each connection going to a given destination address.

The VLAN tag having been allocated, it should be applied to packets where connections first do, or may, diverge in route and/or where the traffic first enters a traffic-engineered domain. Where encapsulation is not being performed, this would usually be where the traffic is first segregated by connection, for example by layer 3-7 filtering. Where the preferred method of encapsulation of customer data is being performed, the node containing the encapsulation point is the preferred logical location for the application of the VLAN tag.

At a similar point towards the egress of the connection, the VLAN tag should be removed. Assuming the destination node is identified as the correct point to remove the VLAN tag allocate above, it is permitted for the destination node to use the destination address/VLAN tag pair, possibly in combination with the ingress port at which the packet arrives, as context for the interpretation of the payload.

It is helpful to identify the logical notion of the customer attachment interface. A customer attachment interface terminates each endpoint of a particular service to a particular customer. There may be one or many customer attachment interfaces associated with a port, or several ports. These interfaces may correspond to different services relating to the same customer or the same/different services relating to different customers. For ingress traffic at those ports, the function of the attachment interface is most sophisticated, as it is required to identify which incoming packets correspond to its associated service.

Those skilled in the art will realise that there are innumerable ways in which the packets to be transported through a given connection can be identified, and that this decision is a purely local function that occurs at the source node (with reference to the decapsulation/untagging destination) and so can be different among the plurality of tag-applying nodes. However, a few examples of the customer attachment interface/service/connection association may help to clarify:

- An association between a specific physical customer-facing port, an encapsulation function, an encapsulation service ID and a given connection.
- An association between a specific physical customer-facing port, a customer VLAN tag, an encapsulation function, an encapsulation service ID and a given connection, and a policer set to identify an acceptable quantity of traffic.
- A layer 3-layer 7 switch identifying a SIP-signalled VoIP flow and establishing a new connection for it. The switch will then establish a suitable filter to identify all of the packets of the flow and attach the appropriate VLAN tag to its packets to route them along the established connection.
- An in-box logical association between a certain connection, encapsulation function and encapsulation service ID with a port of a virtual customer-address-space Ethernet switch instance (as per later VPLS explanation).
- An association between a physical port of a node (the service implicitly including all packets received from that port, with known destination MAC addresses), a VLAN tag application function at that node, and a given connection.

The term 'service instance identifier' is used herein to define the identifier which identifies the customer attachment interface, which might also be referred to as an encapsulation service ID or alternatively as extended service VLAN ID or service instance identifier (as in the current draft of IEEE 802.1 ah).

Figure 6:
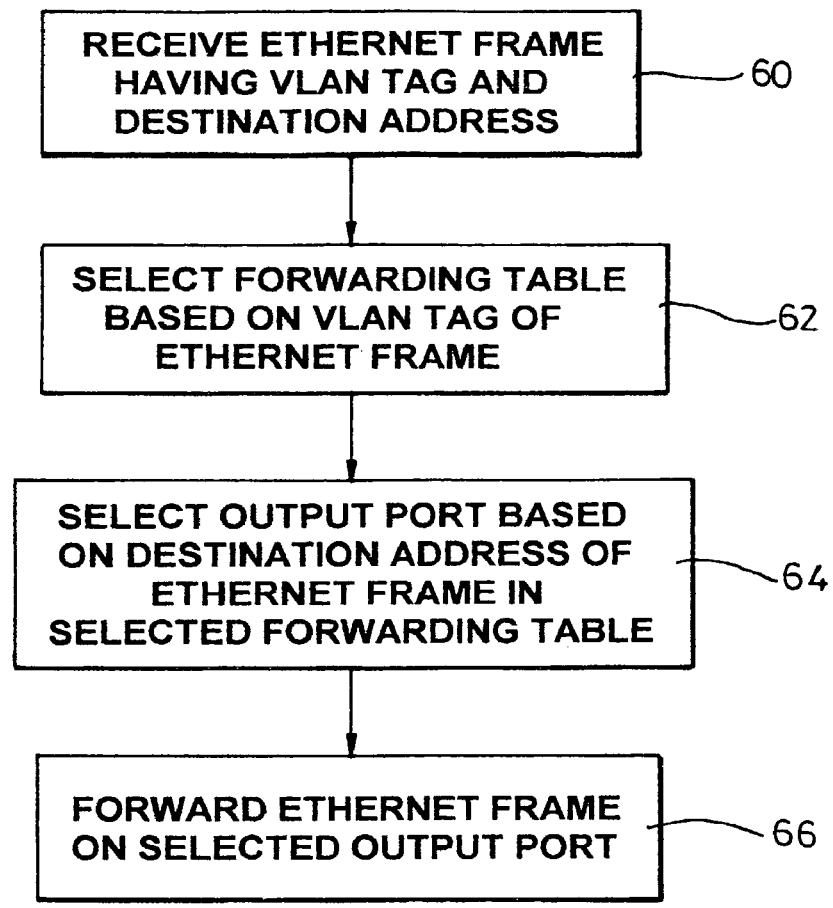
FIG. 6 is a flow diagram showing the preferred use of VLAN tag and destination address to differentiate forwarding of data traffic in different connections across the carrier network, according to the present invention.

FIG. 6 demonstrates the actions on receiving an Ethernet frame (step 60) at an Ethernet switch after the stage at which VLAN tag has been assigned as described above, where the switch first selects a forwarding table based on the VLAN tag contained in the frame (step 62). Then, the switch selects an output port based on the destination address contained in the frame (step 64). Finally, the switch forwards the frame on the selected output port (step 66).

This method of differential forwarding using the combination of VLAN tag and destination address should be contrasted with the method of the prior art IEEE 802.1Q is exemplar of the prior art in which a VLAN is defined to be a partitioning of network resources. For example where those network resources may be defined in terms of ports. A VLAN is a specific set of ports, a subset of all the ports in the network. More specifically that subset of ports would be connected such that data frames may flow only between any of those ports within the subset, and no others of the network. As a direct consequence of this arrangement, any other subset of ports of the network disjoint from the first i.e. not connected must have a distinct VLAN tag. Whereas within the method of the present invention all ports of the network even where in disjoint subsets may have the same VLAN tag. This is because the partitioning of network resources is achieved by the combination of VLAN tag and destination MAC address. The procedure by which the network is configured in the present invention to enable differential forwarding of connections has been described above.

The prior art of VLAN-aware bridges described above with reference to FIG. 1 implement a structural mechanism by which VLAN tag is used first to determine the validity of the tag, and then to access a forwarding table to determine from the MAC address how to forward the frame. This same structural implementation may be reused by the present invention to functionally behave such that the combination of VLAN tag and destination MAC address determine a differential forwarding behaviour. The advantage of using the same structural implementation, although not absolutely necessary, allows existing hardware Ethernet switches to be reused. However the means and rules by which the forwarding tables are populated is distinct from the prior art: according to the present invention, VLAN tags and entries in forwarding tables corresponding to connections to be established across the carrier network are directly configured into the appropriate Ethernet switches using the connection setup process described above. In the preferred embodiment in which encapsulation is used, data traffic is associated with a particular connection on entry into the carrier network (more specifically at the ingress PE-Core) by giving the frames a selected VLAN tag as well as destination address (ie the MAC address of the egress PE-Core). Encapsulation in this context will ensure that the raw Ethernet frames received from the customer will not be altered in this process.

Figure 7:
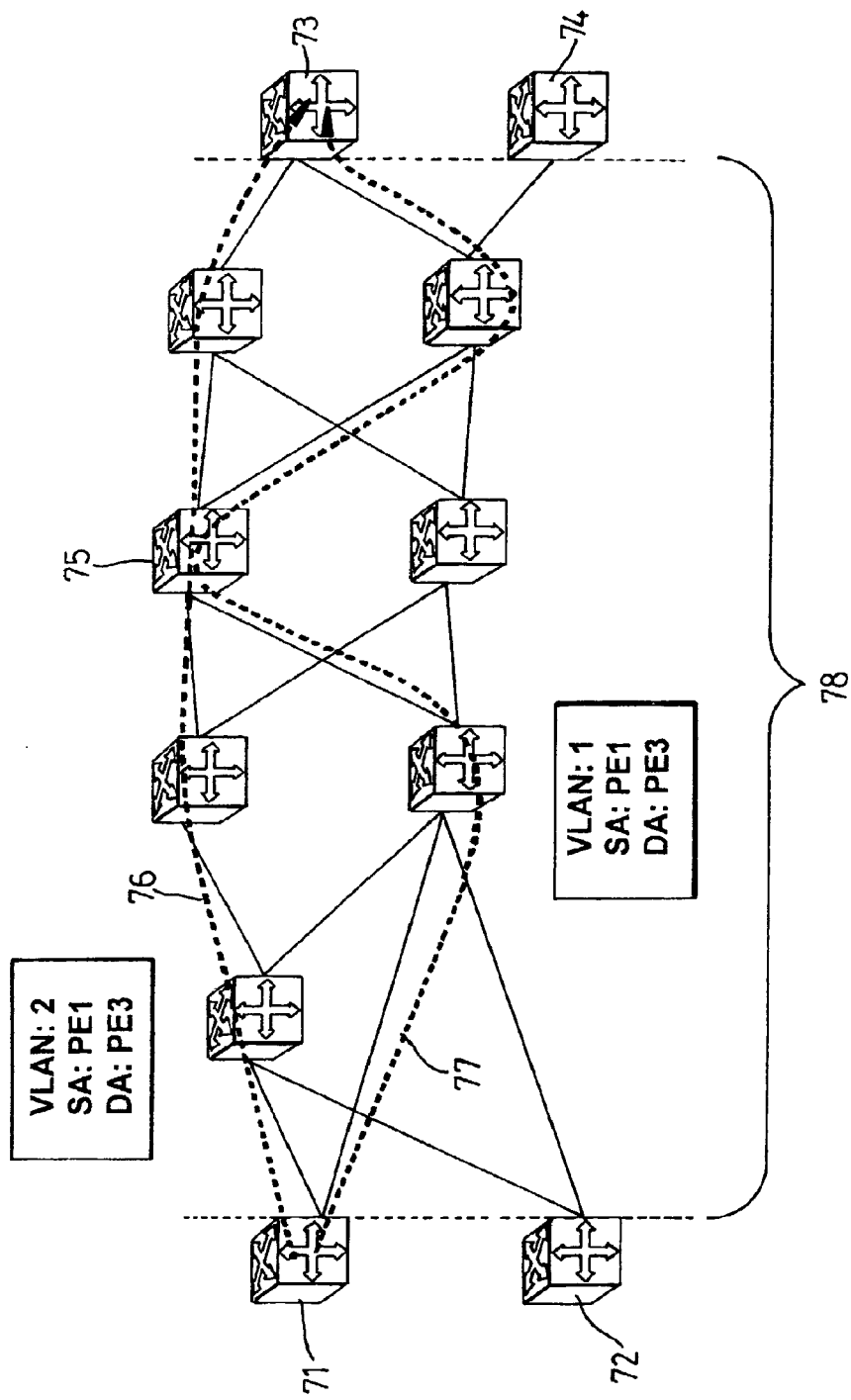
FIG. 7 shows an example of differential forwarding for two traffic flows having the same source and destination provider edge nodes but different VLAN tags according to the present invention.
Figure 8:
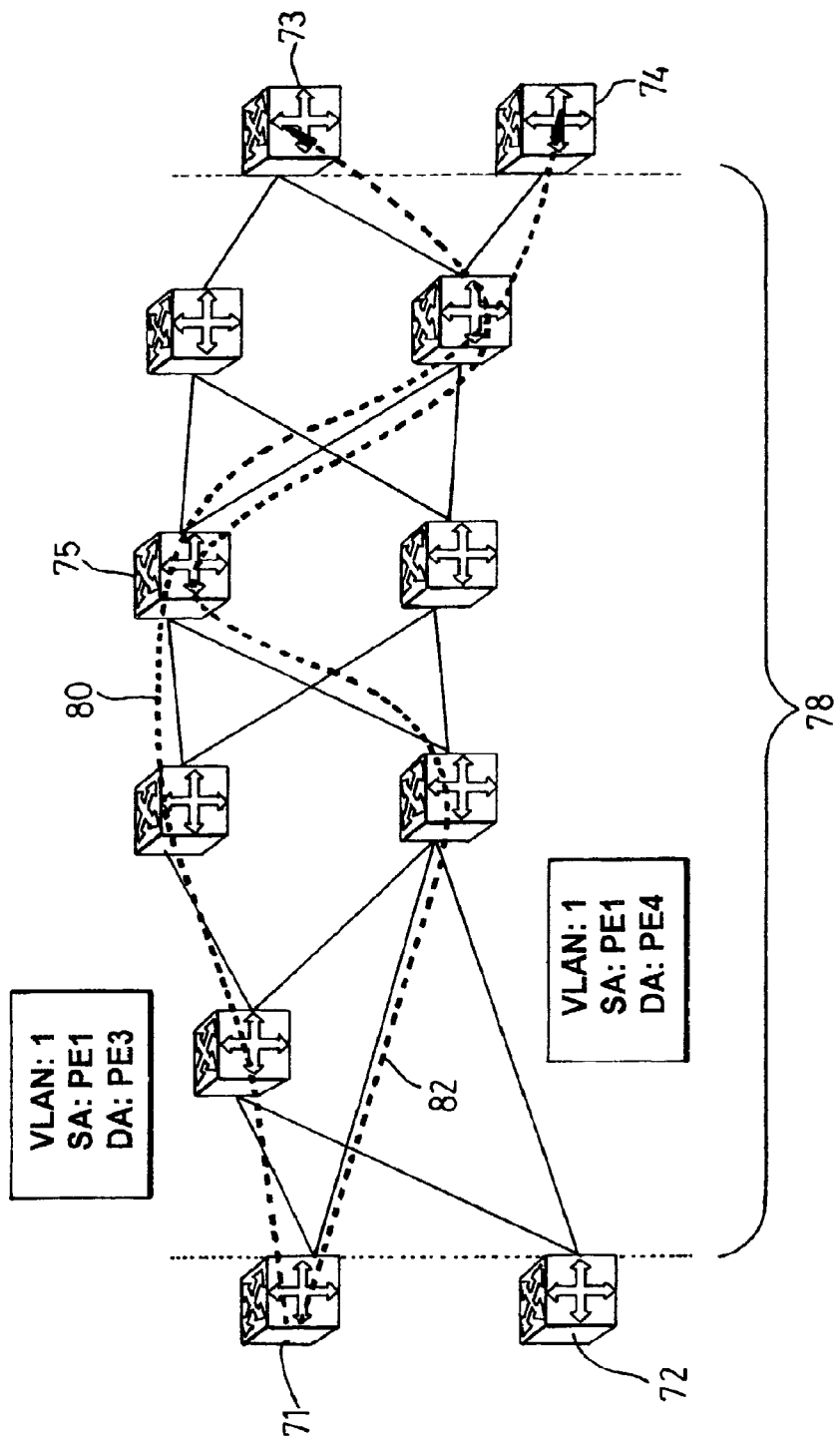
FIG. 8 shows an example of differential forwarding for two traffic flows having the same source provider edge nodes and VLAN tags but different destination provider edge nodes according to the present invention.
Figure 9:
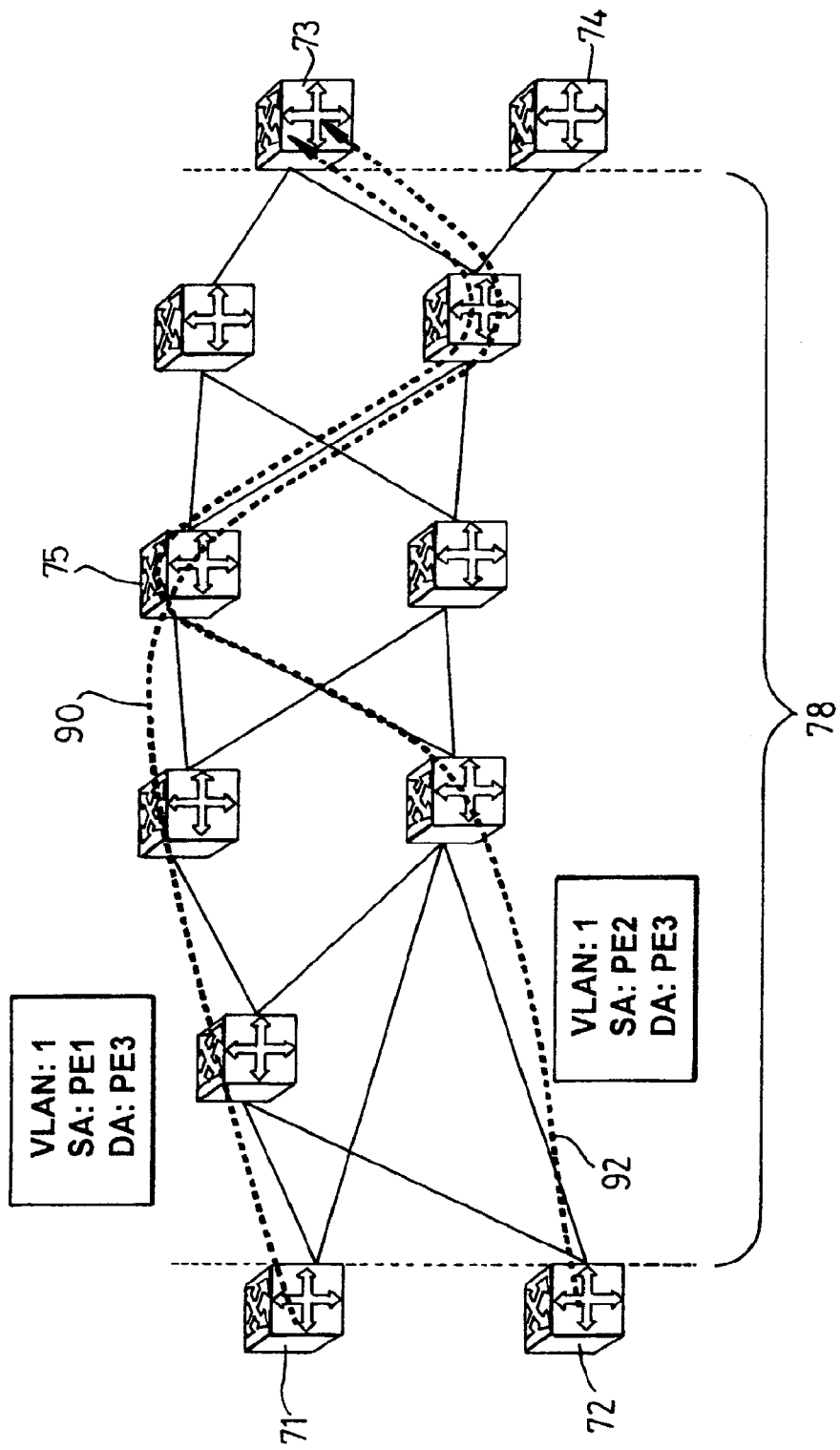
FIG. 9 shows an example of converged routing for two traffic flows having the same destination provider edge node and VLAN tags but different source provider edge node according to the present invention.

FIGS. 7 and 8 show how the use of a combination of VLAN tag and destination address may be used to differentiate connections. FIG. 9 shows how a deliberate lack of differentiation in the combination of VLAN tag and destination address and selection of port causes convergence of otherwise individual connections. Each of FIGS. 7 to 9 show connections across a carrier network comprising 4 provider edge Ethernet switches 71, 72, 73 and 74 (corresponding to PE1, PE2, PE3, PE4), further Ethernet switches in core 78 including core Ethernet switch 75, and communications links between the core and edge switches (reference numerals omitted for clarity).

In FIG. 7, connections 76 and 77 have both the same source address (edge Ethernet switch 71—PE1) and destination address (edge Ethernet switch 73—PE3). However, the routes that connections 76 and 77 traverse are different. In particular, it can be seen that at core Ethernet switch 75, connections 76 and 77 converge and then immediately diverge. Despite the common destination address, core Ethernet switch 75 is able to differentiate frames belonging to connection 76 from frames belonging to connection 77 (and to forward them accordingly) on the basis of their different VLAN tags. Thus, data traffic in connection 76 has the VLAN tag 2, for example, whereas data traffic in connection 77 has the VLAN tag 1.

In FIG. 8, connections 80 and 82 have both the same source address (edge Ethernet switch 71—PE1) and are given the same VLAN tag (in this case the VLAN tag is 1), but have different destination addresses (connection 80 has edge Ethernet switch 73—PE3 while connection 82 has edge Ethernet switch 74—PE4). Again, the routes that connections 80 and 82 traverse are different. In particular, it can be seen that at core Ethernet switch 75, connections 80 and 82 converge and then follow the same path before diverging towards their destination points. Despite the common VLAN tags, core Ethernet switch 75 is able to differentiate frames belonging to connection 76 from frames belonging to connection 77 (and to forward them accordingly) on the basis of their different destination addresses.

From FIGS. 7 and 8 it can be seen that, differentiation between Ethernet frames belonging to different connections is achieved according to the combination of destination address and VLAN tag. A difference in either may be used to achieve differential forwarding required for connections.

FIG. 9 shows how a deliberate lack of differentiation in the combination of VLAN tag and destination address and selection of port causes convergence of otherwise individual connections. In FIG. 9, connections 90 and 92 have the same destination address (edge Ethernet switch 73—PE3), and are given the same VLAN tag (in this case the VLAN tag is 1), but have different source address (connection 90 has edge Ethernet switch 71—PE1 while connection 92 has edge Ethernet switch 72—PE2). Again, the routes that connections 90 and 92 traverse are different, but this is only because the data traffic is injected into the carrier network from different ingress points—ie edge Ethernet switches 71 and 72. Once the routes converge at core Ethernet switch 75, they stay converged until their destination at edge Ethernet switch 73. This is because they have the same destination address and VLAN tag and there is no way of differentiating them on the basis of the combination of destination address and VLAN tag alone.

The ability to establish a plurality of connections between any two points in the network has advantages of resiliency but also for in service maintenance. The is an aspect of the present invention of being able to arrange "make before break" connections in order to change transport characteristics, route around planned maintenance etc. The path re-route may be global with respect to the network, i.e. from source edge to destination edge, or may be local in the sense that a part of the path between any two given nodes on the original path are re-routed.

The actual means by which traffic may be switched in this manner is advantageously only required to change a forwarding rule at a single node for any given direction of a connection. A data traffic flow may be re-routed by simply provisioning a new connection with a different VLAN tag and then using that VLAN tag in the MAC header of the Ethernet frames at the ingress point of the original connection. Re-routing of data flows in this way does not lose any frames since the new connection may be established contemporaneously with the old connection and new Ethernet frames directed into the new connection while earlier frames are still in transit over the old connection. Alternatively, the same VLAN tag and destination MAC address may be configured in nodes not on the existing path but arranged such that the first and last such nodes are connected directly to nodes on the existing path. Then by changing only the port on the node of the existing path that connects to the first such new node, all subsequently transmitted frames are forwarded over the new path. The frames of the new and old paths may be arranged to merge as per FIG. 9 further downstream. Alternatively again, connections may be pre-established—ie in advance of any detected failure—over protection paths. Thus, re-routing data flows in the event of failure is even simpler and quicker, since the ingress point may immediately start transmitting frames over the pre-established connection. Advantageously, and unlike conventional circuit-switched networks, pre-established connections take up no bandwidth until actually being used. Thus 1:n or 1:1 protection schemes may be implemented without resulting in inefficient network resource utilization. If working paths have a differential path delay compared to the protection paths, then buffering may performed at one or more convergence points between the protection and working path to avoid out-of-order frame delivery due to re-routing between working and protection paths. Sequence identifiers may be used in addition or alternatively to enable frame re-ordering, for example In this manner it is possible to effect a fully error free (hitless) switchover.

A further advantage of connections in an Ethernet network is the ability to grow the network organically, in that new nodes and links may be introduced to the network without causing any interference with existing nodes, links, connections or traffic. Any new connections may be established through the additional resources. Furthermore existing traffic may be switched on to the new resources by any of the methods described heretofore. Consequently there is enormous flexibility in the management of real and pragmatic networks.

So far, only the establishment of point-to-point (ie unicast) connections and multipoint-to-point in the context of FIG. 9 where the traffic is either merged or multiplexed (the traffic only meets at the egress node) have been described. However, according to the present invention, point-to-multipoint or multipoint-to-multipoint connections may also be established across Ethernet networks as will now be described. Conventional Ethernet switches are capable of a multicast service. Typically this is achieved by configuring the forwarding table with more than one output port (but not necessarily all output ports) for a given multicast destination address. According to the present invention, for relatively small scale multicast operation, a point-to-multipoint connection may be configured as described above but using a combination of VLAN tag and multicast address mapping to more than one output port (but not necessarily all output ports) of selected Ethernet switches. However, this approach is only suitable for relatively small scale multicast operation.

According to the present invention, a carrier network supporting a large number of point-to-multipoint or multipoint-to-multipoint connections, could be configured as a Resilient Packet Ring (RPR) emulated over the Ethernet MAC addressed network using multiple unicast connections established as described above. The following description is given in the context of a virtual private network (VPN) service, i.e. where there is a limited community of interest for each data frame. Two modes of operation are envisaged: a sparse mode for many customers with few sites, and a dense mode for few customers with many sites. The detailed mechanisms are described in one of the Applicants' co-pending U.S. patent application Ser. No. 10/698,833 (Nortel Networks Reference 15877RO) entitled Virtual Private Networks Within A Packet Network Having A Mesh Topology which document is incorporated herein by reference. The dense and sparse modes of operation will now be briefly described with reference to FIGS. 10 and 11.

Figure 10:
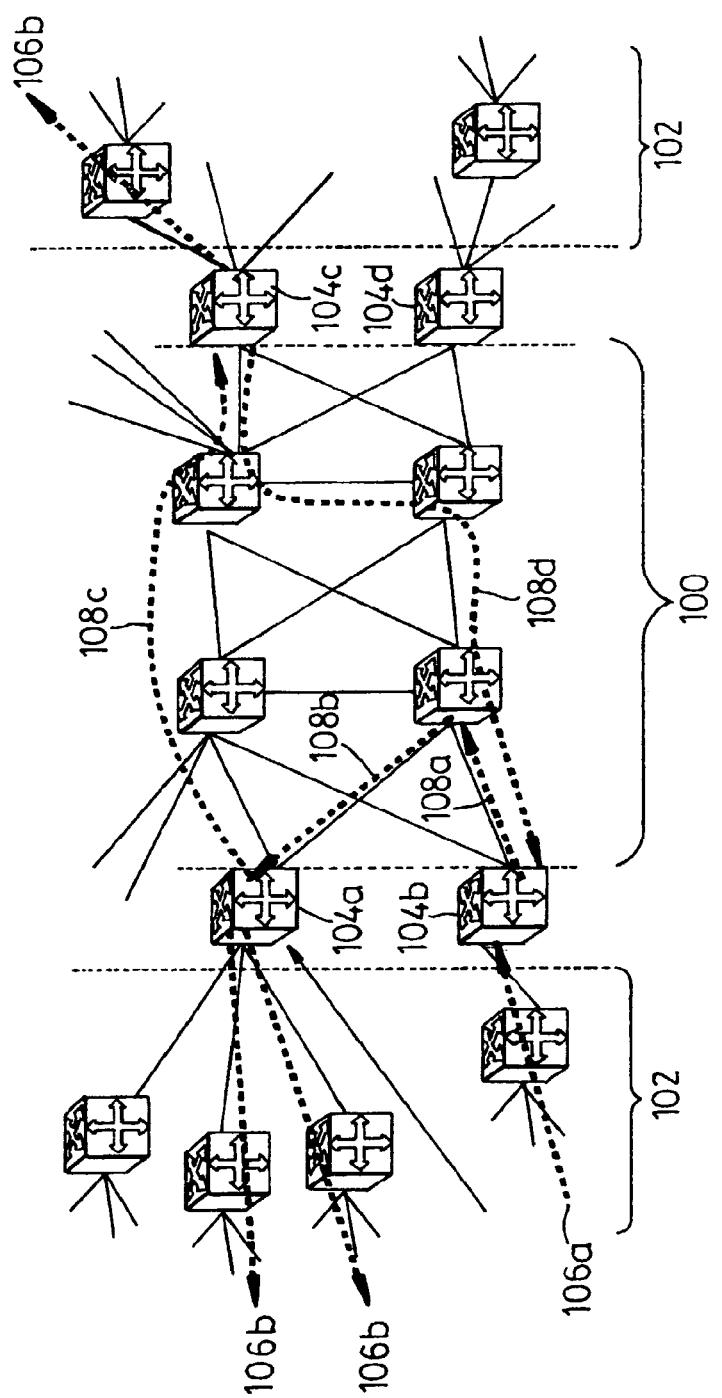
FIG. 10 shows a sparse mode of broadcast operation for customer VPNs provisioned across a carrier network, according to the present invention.

FIG. 10 shows a sparse mode of broadcast operation for many customers with few sites. FIG. 10 shows a part of carrier network 20 comprising a part of fully-meshed core network 100, PE-Core edge Ethernet switches 104 *a* to *d* and PE-Edge edge Ethernet switches 102. Broadcast traffic 106*a* is received at PE-Core switch 104*b* from a customer site. Note that this traffic is broadcast within the context of a particular customer VPN, but is multicast within the context of the carrier network as a whole. The traffic is encapsulated and placed onto an RPR emulated by 4 uni-directional connections 108 *a* to *d*. The four connections are established as point-to-point connections as described above. The traffic is forwarded across each connection in turn until it reaches the start point again at PE-Core switch 104*b*. On receipt of an encapsulated frame, each endpoint of the four connections determines whether to process the frame for distribution to the customer via PE-Edge edge Ethernet switches 102 to which it is connected. This is done on the basis of broadcast destination addresses contained in the frames, and the VPN membership of customer sites attached to these Ethernet switches. Processing the frames involves decapsulating them and replicating them as required to one or more of PE-Edge edge Ethernet switches 102. It can be seen that no bandwidth need be dedicated to broadcast traffic in the sparse mode of operation since the four point-to-point connections may be trunked—ie they may be used to carry non-broadcast data and other customer's data, whether broadcast or not.

Figure 11:
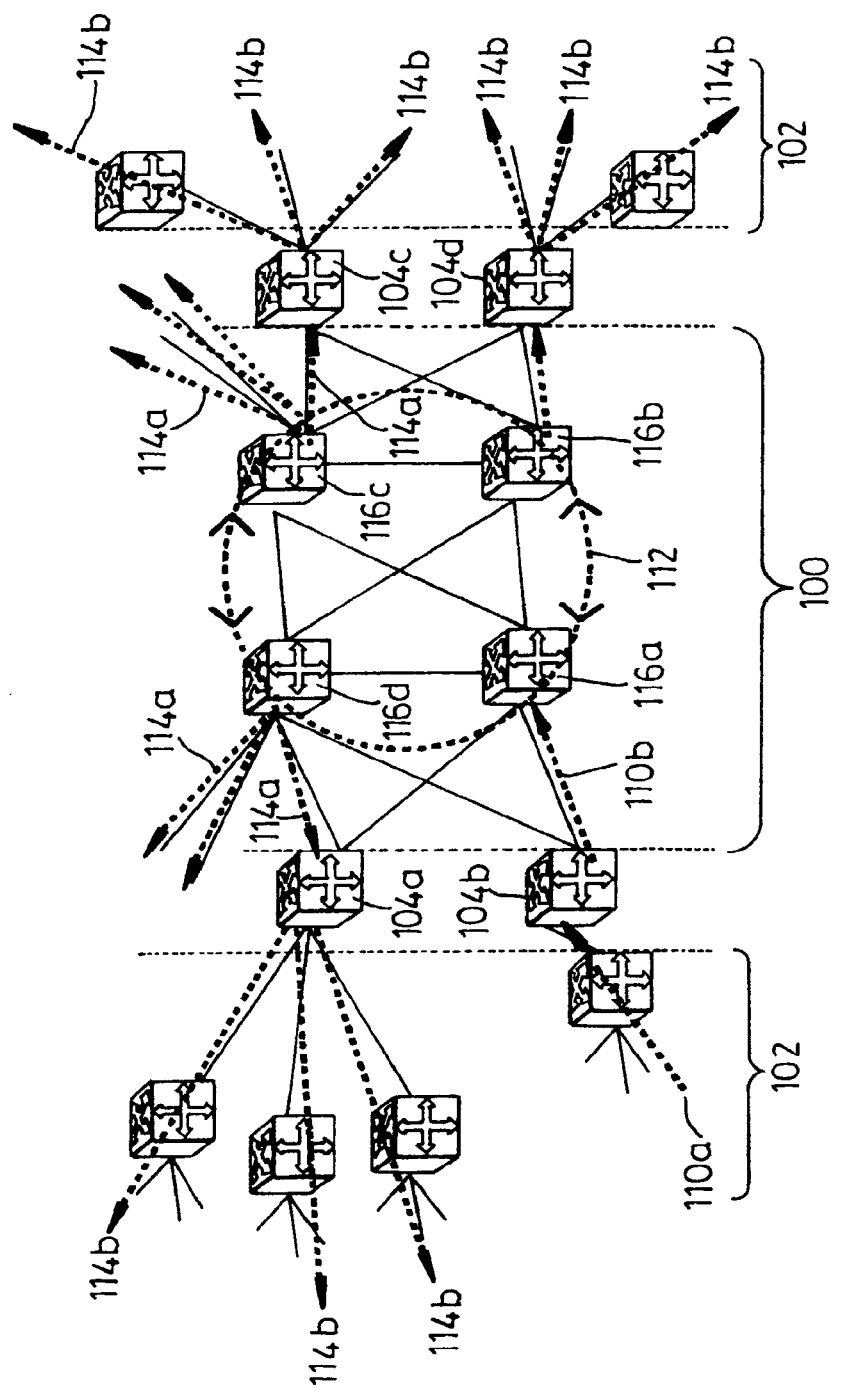
FIG. 11 shows a dense mode of broadcast operation for customer VPNs provisioned across a carrier network, according to the present invention.

FIG. 11 shows a dense mode of broadcast operation for few customers with many sites. FIG. 11 shows a part of carrier network 20 comprising a part of fully-meshed core network 100, PE-Core edge Ethernet switches 104 *a* to *d* and PE-Edge edge Ethernet switches 102 as with FIG. 10. Broadcast traffic 110*a* is received at PE-Core switch 104*b* from a customer site. Note, as above, that this traffic is broadcast within the context of a particular customer VPN, but is multicast within the context of the carrier network as a whole. The traffic is encapsulated and forwarded over a uni-directional connection 110*b* to a core switch 116*a*. Uni-directional connection 110*b* may be trunked. At core switch 116*a*, the traffic is forwarded in over a bi-directional RPR 112 emulated by connections between core switches 116 *a* to *d* using a bidirectional connection between each pair of adjacent nodes. The RPR is dedicated to a particular customer's broadcast traffic and is not trunked. This is achieved by using a unique VLAN tag for forwarding in the RPR.

The traffic is forwarded around RPR 112 to each of the core switches 116 *a* to *d* in one direction or the other, whichever is shortest for each respective core switch. Each core switch broadcasts the received frames over uni-directional connections 114 *a* so that each of PE-Core switches 104 *a* to *d* receives the traffic. Then, as with the sparse mode of broadcast operation described above, each PE-Core switch determines whether to process the frame for distribution to the customer via PE-Edge edge Ethernet switches 102 to which it is connected. This is done on the basis of broadcast destination addresses contained in the frames and involves decapsulating and replicating them as required to one or more of PE-Edge switches 102 for onward transmission to the customer sites.

Figure 12:
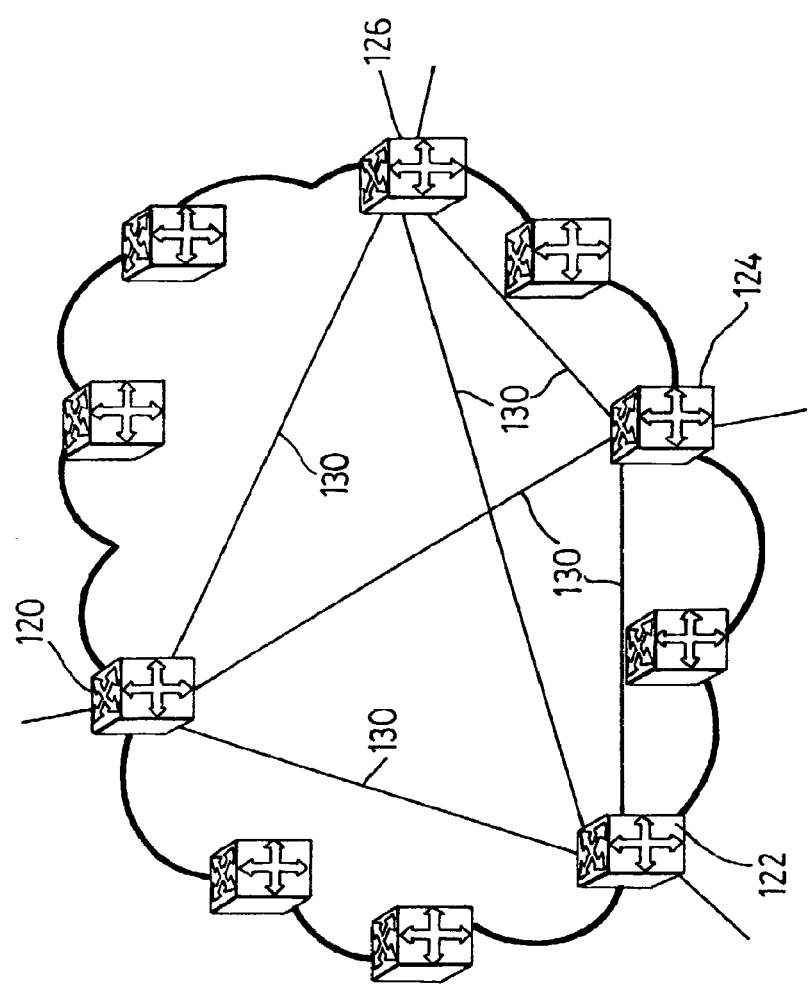
FIGS. 12 to 14 show arrangements for providing a Virtual Private LAN Service (VPLS) according to the present invention.
Figure 13:
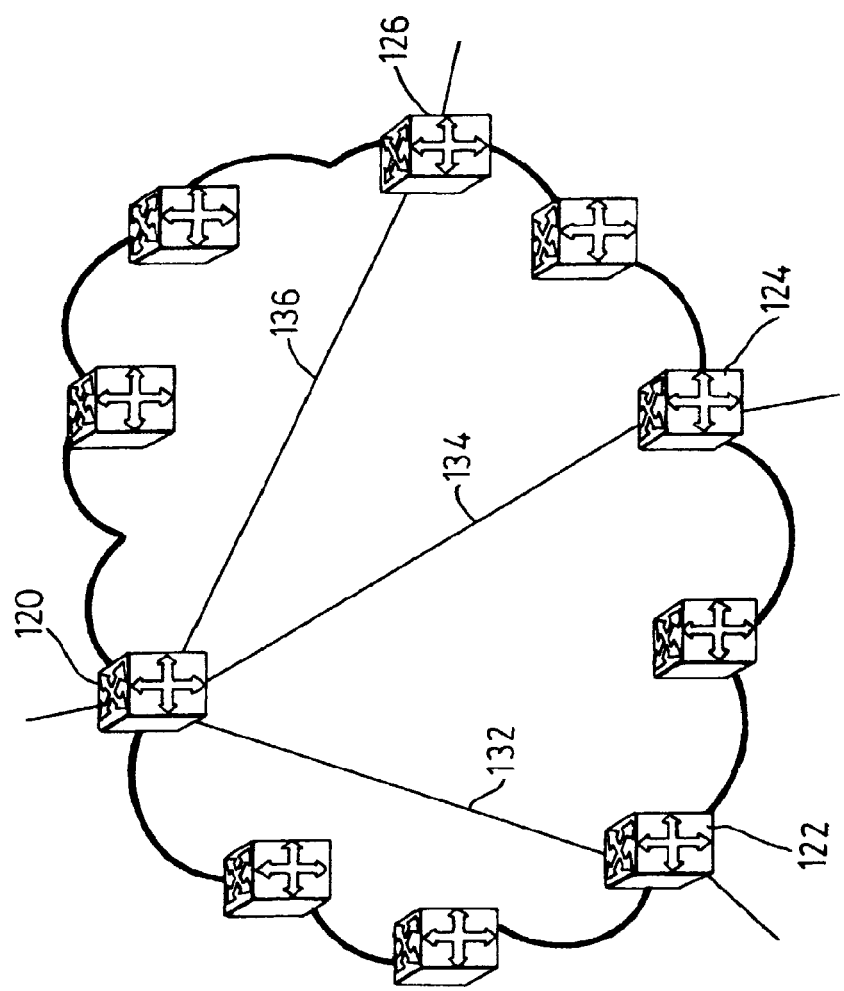
Figure 14:
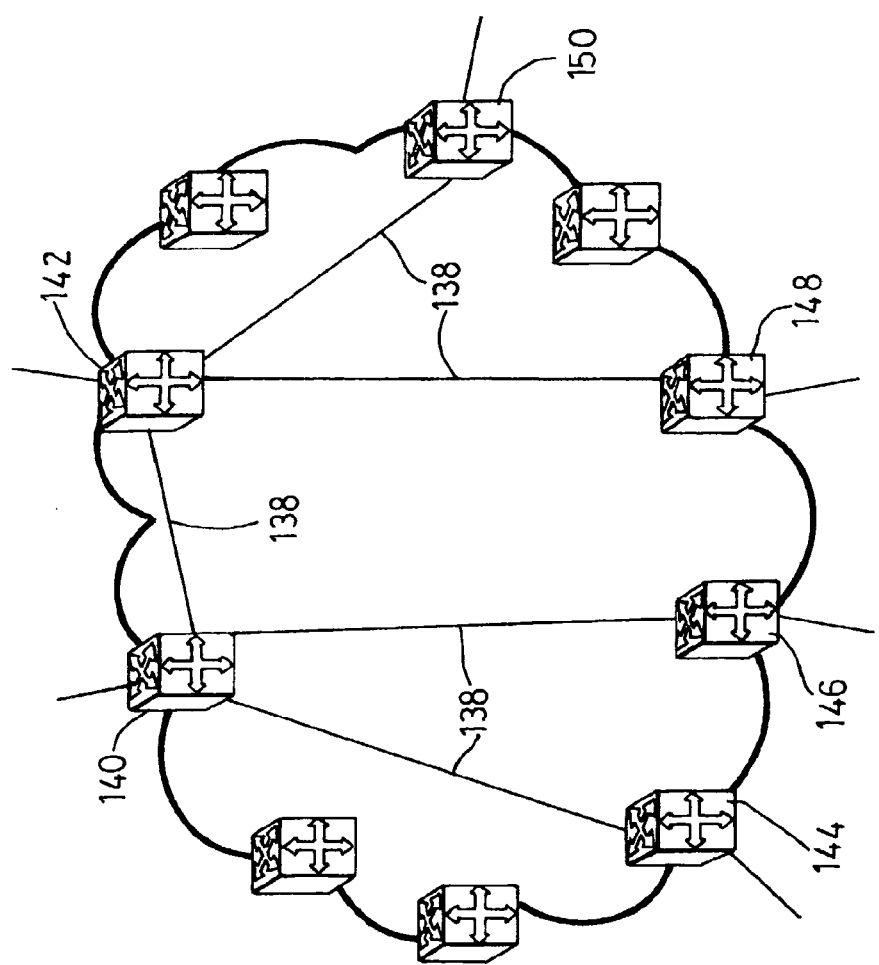

FIGS. 12 to 14 show exemplary arrangements of how Virtual Private LAN Services (VPLSs) may be provided according to the present invention. In VPLSs, potentially geographically distant hosts are provided with any to any communications capability over a carrier network which appears to the hosts to function as if the hosts were directly connected to a private Local Area Network (LAN). According to the present invention, VPLSs are provided over a meshed Ethernet carrier network over which connections may be established as described above. In each Figure, carrier network cloud 20 is comprised of Ethernet switches (only Ethernet switches located at the network edge are shown for clarity).

In FIG. 12, one exemplary arrangement is shown in which 4 geographically distant customer sites (not shown) are respectively connected to 4 carrier edge nodes 120, 122, 124, and 126 which are themselves connected in a full mesh via connections 130, established over the carrier network in accordance with the present invention, to provide a VPLS. In this arrangement, each of the carrier edge nodes 120, 122, 124 and 126 provides conventional Ethernet functionality associated with the physical port used for customer attachment to the PE-core. However, the Broadcast-on-Unknown function, MAC learning of customer addresses reachable via remote PE-cores, etc, is not associated with a physical Ethernet port on the core network side, but with a mesh of point to point connections between participating PE-cores, set up in accordance with the present invention. Thus, broadcast is performed by packet replication at the ingress PE-core, then encapsulation and unicast in the carrier domain. Each customer MAC address as it is learned is associated with the carrier network address and VLAN tag which is used to reach the remote PE-core.

In FIG. 13, another exemplary arrangement is shown in which 4 geographically distant customer sites (not shown) are respectively connected to 4 carrier edge nodes 120, 122, 124, and 126 which are themselves connected in a hub and spoke arrangement via connections 132, 134 and 136, established over the carrier network in accordance with the present invention, to provide a VPLS. A switch/router connected to carrier edge node 120 acts as the hub whereas hosts or switches/routers respectively connected to carrier edge nodes 122, 124, and 126 act as spokes. This switch/router could be owned by the customer, or could be owned by the carrier, located in a central office, and used to offer service to more than one customer. This switch/router is the single entity in the carrier network which needs awareness of customer MAC addresses. Exactly as above, each customer MAC address as it is learned is associated with the carrier network address and VLAN tag which is used to reach the remote PE-core. If a single physical switch is used to support multiple customers, conventional VLAN technology can be used to ensure customer separation in the switch/router. The hub switch/router is responsible not only for providing communications between hosts connected to it and hosts connected to other customer sites, but also for forwarding communications between hosts connected to any two other customer sites. In the latter case, traffic traverses two connections over the carrier network—for example, connection 132 from carrier edge node 122 to carrier edge node 120 and connection 134 from carrier edge node 120 to carrier edge node 124. At carrier edge node 120, after traversing connection 132, the traffic emerges from the carrier network. The hub switch/router identifies that the traffic is for another customer site and switches/routes it back onto the carrier network via the connection 134.

In FIG. 14, another exemplary arrangement is shown in which 6 geographically distant customer sites (not shown) are respectively connected to 6 carrier edge nodes 140, 142, 144, 146, 148 and 150 which are themselves connected in a dual hub and spoke arrangement via connections 138, established over the carrier network in accordance with the present invention, to provide a VPLS. Switches/routers connected to carrier edge nodes 140 and 142 both act as hubs whereas hosts or switches/routers respectively connected to carrier edge nodes 144, 146, 148 and 150 act as spokes. As with the arrangement in FIG. 13, the hub switches/routers are responsible not only for providing communications between hosts connected to them and hosts connected to other customer sites, but also for forwarding communications between hosts connected to any two other customer sites. In the latter case, as with the arrangement in FIG. 13, traffic may traverse two connections or three connections if the customer sites are not directly connected by single connections to a single hub switch/router.

It will be appreciated that other arrangements of VPLSs are possible having any number of customer sites connected in a full mesh or in a single or multi hub and spoke arrangement or combinations of the two. The choice of arrangement will largely depend on the communities of interest in the various customer sites and the bandwidth required there between. In further embodiments, the two or multiple hub switches/routers may be provided at each customer site, each connected via connections to one or more other customer sites to provide load balancing and resiliency. The connections used to provide VPLS may be unique to the customer or trunked in the sense that multiple customers use trunk connections.

Engineered connections set up according to the present invention may also be used to support engineered layer 3 any-to-any VPNs in accordance with RFC 2547 when these are implemented as disclosed in [ref to 16898ROUS01U]. That disclosure describes a method and system for allowing an engineered virtual private networking solution through the use of a tandem routing device as a virtual hub in a logical hub and spoke network topology. This provides an engineerable alternative to the full mesh connectivity between PE-cores normally used to support any-to-any services.

It will be apparent to those skilled in the art that that the designation for each VPN of a tandem switching point at layer 3 constrains the traffic flows from all PE-cores supporting a specific VPN to pass through said tandem switch, and so setting up connections according to the present invention between all PE-cores and the tandem switch allows the determinism and predictability at layer 3, as described in co-pending U.S. patent application Ser. No. 10/910,685 filed 4 Aug. 2007, to be exploited in the transport layer as well.

Data plane monitoring functions such as heartbeat, ping and connection monitoring using the ITU-T standard-in-preparation currently referred to as Y.17ethOAM has been mentioned above. These methods may be used to perform end to end connection monitoring and fault detection as follows. In one embodiment, a defined and well-known EtherType is assigned to Operations and Maintenance (OAM) frames, such as heartbeat or ping messages, which are sent across the end to end connections established in the network using the same destination address and VLAN tag as data plane traffic is sent across those connections. The EtherType field is not used for forwarding in the network but is used to filter OAM traffic from data frames at the network edge. OAM frames may then be forwarded to OAM systems. Thus, OAM frames, such as heartbeat or ping messages, will be forwarded in the network in the same way as of data plane frames and will therefore share the same fate as data plane frames. Thus, OAM traffic can be used for fault detection and end to end connection monitoring. In a second embodiment, OAM traffic is not forwarded over the same connections as data plane traffic. Rather, separate OAM connections are established using one or more different destination addresses to those connections to be used for data plane traffic. Individual OAM connections are at least partially co-routed and possibly fully co-routed with individual data plane connections so that OAM frames share the same fate as data frames at least over the co-routed portions. However, the different destination addresses correspond to the address or addresses of a OAM management system or server. Advantageously, this avoids the need for line-rate filtering on EtherType at network edge nodes. It is also advantageous in a further embodiment to preferentially arrange a largely separate mesh of OAM connections across the network which can be monitored and used to "triangulate" the location of faults through correlation. This could be used to determine the affected data plane connections, while there may be little fate sharing between any one individual OAM connection and any one individual data plane connections.

The frequency of the ping or heartbeat frames may be used to adjust the distribution of the time interval to detect faults. The detection of faults may be used to trigger a protection switch on to a suitably configured protection path, and the trigger may be effected directly in hardware or software. Alternatively, the alarms may be filtered in a higher order system before triggering a protection switch to improve control of the network. End to end OAM in a connection may limit the frequency with which pings and heartbeat may be sent so as not to overload the network with this traffic type. In a further embodiment it is possible to implement pings and heartbeats on each individual link between Ethernet switches, or on segments of the end to end connections. Any detected failure on such a link or segment is straightforwardly correlated to the connections it affects by direct consultation of the forwarding tables in the Ethernet switches at either end. The alarm state may be propagated along all or some of the respective connections to the end point to trigger the same protection mechanism above. However, the link or segment heartbeats may be sent at higher frequency than those of an end to end connection with a much lower chance by orders of magnitude of overloading the network, since links and segments are much fewer in number.

To enforce QoS requirements, such as bandwidth guarantees, over connections established according to the present invention, admission control and policy enforcement may be implemented at ingress nodes as described above. Admission control may also be performed in the control or management planes also as described above. Different classes of service may be provided for traffic forwarding by classifying customer traffic on the basis of customer one or more of the following: VLAN tag, IEEE 802.1p priority level, DiffSery codepoint (DSCP), MPLS EXP bits and so on. The classification may be mapped to carrier VLAN tag or using IEEE 802.1p or 802.1ad strict priority level, for example, for marking and segregation in the carrier network. Those skilled in the art will appreciate that classes of service may be distinguished in very many ways that are compatible with the present invention, which may be based on a mapping of a explicit marking of an incoming frame by a wide variety of possible fields to an explicit marking in network 20, an explicit marking of an incoming frame by a wide variety of possible fields to an implicit forwarding treatment for a given connection in network 20, an implicit classification of a variety of possible fields in an incoming frame to an explicit marking in network 20, and an implicit classification of a variety of possible fields in an incoming frame to an implicit forwarding treatment for a given connection in network 20. Those skilled in the art will also appreciate that an original marking may be remapped or remarked on egress by those frames from network 20. Conflicts for forwarding resources at nodes of the carrier network may be resolved by 1) using a strict priority scheduling scheme (such as IEEE 802.1p) in which frames of higher priority are always forwarded in preference to frames of lower priority; 2) using a weighted fair queuing scheduling scheme in which classes of frames having lower priority still have some proportion of forwarding resources albeit lower than classes of frames having higher priority; or 3) using a differential discard eligibility scheduling mechanism in which the discard rate (a function of queue fill) applied to frames entering the queue for output over an output port of an Ethernet switch is different for different classes of traffic. In 3) above, the discard rate for classes of traffic having a lower priority is higher than the discard rate for classes of traffic having a higher priority for equivalent queue fill. Thus, proportionately more lower priority frames are discarded than higher priority frames as the output queue fills up. However, unlike in 1) and 2) above, frame disordering between different classes of traffic cannot occur because there is effectively only one queue. This has the advantage of permitting customers with guaranteed bandwidth connections to burst over agreed bandwidth limits using lower priority classes of traffic, without introducing potential disordering of frames. Those skilled in the art will appreciate that any or all of the mechanisms of classifying, marking, remarking, policing and scheduling may be applied to traffic according to the ability to differentiate connection forwarding using the combination of VLAN tag and destination MAC address, and any other fields of the frame as necessary.

It has been described above how connections may be established over a meshed Ethernet carrier network through configuring forwarding tables in network nodes and how data may be forwarded over those connections. The reader will appreciate that connections may be removed by deleting the configuration data from every node over which the connection was established. It is important that all such configuration data is removed to avoid network failure or inefficiency. The default behaviour of Ethernet switches on receiving a frame addressed to an unknown destination (ie where there is no forwarding state configured for that destination address) is to broadcast the frame out on all output ports. In simply-connected networks this behaviour is appropriate. However, with a meshed topology, this behaviour can be catastrophic. Through partial removal of connections (in particular where configuration data is left at ingress points of a connection but deleted at points further along the connections towards or including the egress point), it remains possible that Ethernet frames for the PE may enter the network but arrive at a point where there is no configuration data for forwarding them, resulting in undesirable broadcast behaviour. Furthermore, partial removal of connections may leave forwarding loops configured by accident.

One solution to the problem of partial removal of connections is to alter the behaviour of the Ethernet switches forming the carrier network so that instead of broadcasting unknown traffic, they discard packets and possibly issue an alarm, log or count the discarded packets. However, altering the basic behaviour of Ethernet switches may require a hardware modification. While possible, this is not preferable. However, conventional Ethernet switches generally provide a software configurable function called rate limitation. Preferably, at all or most switches of the carrier network rate limitation is used to set a rate of zero, or a low rate if zero is not possible, for broadcast traffic including broadcast-on-unknown traffic.

Where this is not possible, other pre-emptive approaches to minimising the problems of partial removal of connections may be used. One approach is to use block lists otherwise know as access control lists or ACLs. Conventional Ethernet switches provide a block list (typically of limited length) which may be used to specify certain destination MAC addresses such that received Ethernet frames addressed to these blocked address will be discarded without forwarding. By blocking, at all or most nodes of the network, the MAC addresses of many (but not all) MAC addresses of provider edge nodes it is possible to minimise the potential dangers of partial removal of connections without over restricting the carrier's flexibility in establishing connections across the network. Notably, it is necessary to block different MAC address at different nodes of the network. Typically, at a given node, the block list will include only the MAC address for provider edge nodes to which no connections are likely to be established through that node. This approach is not easily scaleable with large networks (the limited number of entries in block lists may be exhausted by large numbers of provider edge nodes). However, note that to prevent loops it is only necessary to block rogue frames at one node in any loop. Thus, it is possible to "spread" the blocked destination addresses more thinly across the network and still provide a degree of protection from loops thereby making more efficient use of the limited capacity of block lists.

While it is the use of VLAN tags in the present invention that enables flexibility in establishing connections across the network, the failure to remove connection state fully leaves the potential for looping of traffic. In particular, the problem will arise where a logical loop is left configured for any single given VLAN tag—ie the output ports of nodes defining a physical loop are left configured with membership of any single VLAN tag. Thus, another pre-emptive approach to minimising the problems of partial removal of connections is to allocate connections to or from neighbouring or nearby provider edge nodes using mutually exclusive VLAN tag pools. Thus, for example all connections to or from provider edge node PE1 will be guaranteed to have a different VLAN tag to those to or from neighbouring provider edge node PE2. In this way, loops including both PE1 and PE2 cannot accidentally be formed through the partial removal of connections since by definition any state left configured in PE1 and PE2 will use different VLAN tags. This approach may be generalised by allocating connections to or from n adjacent provider edge nodes using n mutually exclusive VLAN tag pools. n is chosen to be sufficiently large to segregate use of VLAN tag pools as much as possible while providing sufficient flexibility in connection establishment to or from any particular provider edge node (bearing in mind that there are only 4094 possible VLAN tags). With smaller carrier networks it may be possible for each provider edge node to use a different VLAN tag pool. However, with larger carrier networks it will be necessary to re-use VLAN tag pools at topologically distant provider edge nodes otherwise flexibility in connection establishment will be compromised though VLAN tag pools being too small. A further embodiment that does not require manual administration is for each Ethernet device to pick a random starting point in the VLAN range for allocation.

It will be appreciated that combinations of the above approaches to minimising the problems of partial removal of connections may be employed.

Mixed-mode networks so called because they combine conventional Ethernet, 802.1Q, or other forwarding modes, simultaneously with the connection-oriented forwarding mode present invention, may also be implemented. In mixed-mode networks, part of the VLAN tag space (for example VLAN tags 1-2048) is assigned to conventional mode Ethernet forwarding and operates using a VLAN-aware spanning tree protocol and auto address learning. Another part of the VLAN tag space (for example VLAN tags 2049-4096) is assigned to connection-oriented mode Ethernet forwarding as described above. Note that the use of two or more such VLAN spaces creates logically separate forwarding mode networks over the same physical network. Forwarding state installed in Ethernet switches in one mode (for example through auto address learning and spanning tree) is differentiable from forwarding state installed in Ethernet switches in another mode (for example through control plane connection setup procedures according to the present invention) by having different VLAN tag spaces assigned. Thus, forwarding state in one mode, and mechanisms for installing or removing such forwarding state, do not affect forwarding of traffic in another mode and vice versa.

In mixed-mode Ethernet networks, preferably the connection-oriented Ethernet mode is given a higher forwarding priority than the conventional Ethernet mode so that QoS (in particular bandwidth and latency) may be guaranteed for connection-oriented Ethernet mode connections. This may be achieved through assigning a higher priority level to frames belonging to the connection-oriented Ethernet mode VLAN space using IEEE 802.1p strict priority, for example. Conventional Ethernet mode forwarding may then be offered as a best efforts service and may be used to allow customers guaranteed connections to burst over agreed bandwidth guarantees when overall network loading permits. Another possible example of a mixed-mode Ethernet network would be to have one part of the VLAN tag space (for example VLAN tags 1-1024) assigned to conventional mode Ethernet forwarding, another part (for example VLAN tags 1025-2048) assigned to VLAN label switching (as described in draft-kawakami-mpls-lsp-vlan-00.txt, for example) and another part (for example VLAN tags 2049-4096) assigned to connection-oriented mode Ethernet forwarding as described above. Advantageously, control plane metrics may be "leaked" (ie purposefully communicated) between different forwarding modes so that, for example, spanning tree converges on virtual topologies that will avoid heavily loaded links primarily utilizing the connection-oriented mode. This is in addition to use of priority above to mitigate resource collisions between modes.

While embodiments have been described above with reference to the use of VLAN tags for enabling flexibility in establishing and differential forwarding of data traffic associated with different connections, the reader will appreciate that other tags or identifiers may be used. For example, MPLS labels may be used. In this case, the MPLS labels are appended, prepended or inserted into the Ethernet frames and Ethernet switches in the network forward based on a combination of Ethernet destination address and MPLS label. Note, that this is entirely different to conventional use of MPLS labels since the MPLS labels are not used for label switching.

Also, while embodiments have been described above with reference Ethernet networks and Ethernet frames, those skilled in the art will appreciate that the present invention applies in general to any frame-based, packet-based or cell-based switching network whether at OSI layer 2 or layer 3 network. And to data structures including frames, packets and cells. In the following claims, the term frame-based network, or cognate terms, shall denote any such switching network and the term frame, or cognate terms, shall denote any such data structure. For example, IP networks comprising a mesh of IP routers may be used to route IP packets. Conventional Open Shortest Path Forwarding (OSPF) control plane mechanisms would be disabled to allow direct configuration of forwarding or routing tables. In this case, the routers may be configured to route on a combination of IP destination address and VLAN tags, MPLS labels, DiffServ codepoints, IPv6 flow labels, type of service, traffic class or other such fields, or optional fields added specifically to act as identifiers. This is of particular interest where IP/IP, IP/MPLS and Psuedo Wire/IP or similar forms of encapsulation are used in order to maintain customer separation over this forwarding layer.

It will also be appreciated that addresses other than destination address may be used in combination with a qualifying identifier to enable differential forwarding according to the present invention and thereby to enable the establishment of connections. In particular, forwarding may be performed on the basis of a source address of data frame corresponding to a source node. Furthermore, forwarding may be performed on the basis of any address field contained in a data frame or specifically added to a data frame. Furthermore, differential forwarding may be performed on the basis of a combination of source and destination address, or on the basis of a single address field which can uniquely address a sufficiently large space of nodes and additionally can qualify the address to enable differential forwarding of data frames. The reader will appreciate that the methods described above may be implemented in the form of hardware or software operating on conventional data processing hardware.

The invention claimed is:

1. A carrier Ethernet network configured for providing a Virtual Private LAN Service (VPLS), the carrier Ethernet network comprising:
   a first node configured:
      to receive a frame from a customer, the frame having a first customer MAC address as a customer source MAC address and a second customer MAC address as a customer destination MAC address;
      to encapsulate the frame for transport across the carrier Ethernet network with a VLAN identifier, an encapsulating source MAC address and an encapsulating destination MAC address, the encapsulating source MAC address being a MAC address of the first node; and
      to forward the encapsulated frame across the carrier Ethernet network based on the combination of the VLAN identifier and the encapsulating destination MAC address; and
   a second node configured:
      to receive the encapsulated frame;
      to configure a mapping between the customer source MAC address of the frame and the MAC address of the first node, the MAC address of the first node being learned from the encapsulating source MAC address of the frame; and
      to forward the frame to the customer based on the customer destination MAC address.

2. The network of claim 1, wherein:
   the first node is configured:
      to store association data associating a service instance identifier, a customer attachment interface terminating a customer service and a combination of a VLAN identifier and the encapsulating destination MAC address; and
      to further encapsulate the frame for transport across the carrier Ethernet network by including the service instance identifier in the encapsulated frame; and
   the second node is configured to forward the frame to the customer identified by the service instance identifier in the encapsulated frame.

3. The network of claim 2, configured to associate a first service instance identifier with a first customer and a second service instance identifier with a second customer, wherein:
   the first node is configured:
      to encapsulate a first frame from a first customer attachment interface associated with the first customer with a VLAN identifier, an encapsulating destination MAC address and the first service instance identifier;
      to encapsulate a second frame from a second customer attachment interface associated with the second customer with the VLAN identifier, the encapsulating destination MAC address and the second service instance identifier; and
      to forward the encapsulated first and second frames across the carrier Ethernet network based on the combination of the VLAN identifier and the encapsulating destination MAC address; and
   the second node is configured:
      to receive and decapsulate the encapsulated first and second frames; and
      to forward the decapsulated first and second frames to the first and second customers respectively based on the first and second service instance identifiers received in the encapsulated first and second frames respectively.

4. The network of claim 1, wherein the second node is configured:
   to receive a frame from the customer, the frame having the first customer MAC address as a customer destination MAC address; and
   to use the mapping between the first customer MAC address and the MAC address of the first node and the VLAN identifier to encapsulate the frame for transport across the carrier Ethernet network with the VLAN identifier, an encapsulating source MAC address and an encapsulating destination MAC address, the encapsulating source MAC address being the MAC address of the second node.

5. The network of claim 4, wherein the mapping between the customer source MAC address of the frame and the MAC address of the first node comprises a mapping between the customer source MAC address of the frame and a combination of the MAC address of the first node and the VLAN identifier.

6. The network of claim 1, further configured to establish a connection through the carrier Ethernet network by, without Ethernet unknown destination address forwarding and source address learning:
   determining a path for the connection through the Ethernet carrier network;
   selecting a VLAN for association with the connection, the VLAN having a VLAN identifier;
   selecting an encapsulating MAC address for association with the connection; and
   configuring, in at least one intermediate node along the connection, a respective mapping for use by the intermediate node in forwarding data frames carrying the VLAN identifier of the selected VLAN and the selected encapsulating MAC address as a destination address, each respective mapping associating a combination comprising the selected encapsulating MAC address and the VLAN identifier with a selected output port of the intermediate node;

wherein forwarding the encapsulated frame based on the combination of the VLAN identifier and the encapsulating MAC address comprises forwarding the frame on the established connection.

7. The network of claim 1, wherein the mapping between the customer source MAC address of the frame and the MAC address of the first node comprises a mapping between the customer source MAC address of the frame and a combination of the MAC address of the first node and the VLAN identifier.

8. A carrier Ethernet network configured for forwarding customer data frames, the network comprising:

at least one connection controller configured to establish a connection through the carrier Ethernet network by, without Ethernet unknown destination address forwarding and source address learning:

determining a path for the connection through the Ethernet carrier network;

selecting a VLAN for association with the connection, the VLAN having a VLAN identifier;

selecting an Ethernet MAC address for association with the connection; and forwarding packets associated with the selected VLAN and the selected Ethernet MAC address at nodes on the path based on the combination of the VLAN identifier and the Ethernet MAC address without changing the VLAN identifier; and a node identified by the Ethernet MAC address selected for a particular connection configured:

to receive a customer data frame over the particular connection, the customer data frame having a particular customer source address;

in response to receipt of the customer data frame, to configure a mapping between the particular customer source address and a source Ethernet MAC address of the received frame;

to receive further customer data frames at the node, the further customer data frames having a customer destination address equal to the particular customer source address; and to forward the further customer data frames over a connection associated with the Ethernet MAC address to which the customer destination address is mapped by the mapping.

9. The network of claim 8, configured:

to associate at least one respective service instance identifier with each of a plurality of customers;

to associate one of the respective service instance identifiers with each data frame associated with a customer;

to forward customer data frames associated with different customers over the particular connection based on the VLAN identifier and the Ethernet MAC address of the particular connection; and at the node identified by the Ethernet MAC address, to forward the customer data frames to appropriate customers based on the respective service instance identifiers in each data frame.

10. The network of claim 9, wherein the plurality of connections comprises establishing a mesh of connections in the carrier Ethernet network.

11. The network of claim 9, configured:

to configure mappings of customer destination addresses to respective connections at nodes of the carrier Ethernet network; and to forward customer data frames over respective connections determined based on the mappings.

12. The network of claim 8, configured to establish a plurality of connections by establishing at least one hub and spoke pattern of connections in which multiple spoke nodes have connections to a hub node.

13. The network of claim 12, having:

mappings configured at the spoke nodes to establish respective connections between the spoke nodes and the hub node to enable the spoke nodes to forward customer data frames from the spoke nodes over the respective connections to the hub node based on the mappings; and mappings configured at the hub node to establish respective connections to the spoke nodes to enable the hub node to forward customer data frames from the hub node to respective spoke nodes based on the mappings.

14. The network of claim 13, configured:

to forward customer data frames from a respective ingress spoke node to the hub node based on mappings configured at the ingress spoke node; and to forward customer data frames from the hub node to a respective egress spoke node based on mappings configured at the hub node.

15. The network of claim 8, configured to implement a virtual private LAN service (VPLS).

16. The network of claim 8, configured:

to reserve a first plurality of VLANs for use in establishing a plurality of connections through the carrier Ethernet network without Ethernet unknown destination address forwarding and source address learning; and to reserve a second plurality of VLANs for use in Ethernet forwarding using conventional Ethernet unknown destination address forwarding and source address learning, the second plurality being distinct from the first plurality.

17. The network of claim 16, configured to disable broadcast-on-unknown-destination-address and Ethernet source-address-learning functionality for data frames associated with the first plurality of VLANs but not for data frames associated with the second plurality of VLANs.

18. The network of claim 17, wherein the first plurality of VLANs is configured with a higher forwarding priority than the second plurality of VLANs.

19. The network of claim 16, configured to communicate control plane metrics from the first plurality of VLANs to the second plurality of VLANs.

20. The network of claim 19, wherein spanning trees of the second plurality of VLANs are configured to avoid links heavily loaded by the first plurality of VLANs.

* * * * *